US007065332B2

(12) United States Patent
Tomida et al.

(10) Patent No.: US 7,065,332 B2
(45) Date of Patent: Jun. 20, 2006

(54) REMOTE CONTROL RECEIVING SYSTEM

(75) Inventors: Yasuyuki Tomida, Osaka (JP); Hironobu Mori, Hyogo (JP); Koji Kitamura, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 530 days.

(21) Appl. No.: 10/636,652

(22) Filed: Aug. 8, 2003

(65) Prior Publication Data

US 2004/0059531 A1 Mar. 25, 2004

(30) Foreign Application Priority Data

Aug. 9, 2002 (JP) ............................ 2002-232406

(51) Int. Cl.
*H04B 1/18* (2006.01)

(52) U.S. Cl. ................ 455/151.2; 455/352; 455/152.1; 455/92; 340/5.72

(58) Field of Classification Search ................ 455/352, 455/151.1, 92, 152.1, 151.2; 340/825.69, 340/825.72, 5.72, 5.63; 702/79, 63
See application file for complete search history.

(56) References Cited

U.S. PATENT DOCUMENTS 4,761,644 A * 8/1988 Kawai et al. .............. 340/5.63
5,752,184 A 5/1998 Ishimura
5,774,064 A * 6/1998 Lambropoulos et al. ..................... 340/825.69
5,940,001 A * 8/1999 Okayasu et al. ........... 340/5.63
6,021,319 A * 2/2000 Tigwell .................... 455/151.2
6,091,341 A * 7/2000 Nose et al. ............ 340/825.69
6,225,916 B1 * 5/2001 Sugimoto et al. ...... 340/825.69
6,624,740 B1 * 9/2003 Nose et al. ................ 340/5.72
6,765,473 B1 * 7/2004 Pavatich et al. ........... 340/5.63
2001/0034213 A1 * 10/2001 Tsui ........................... 455/352
2002/0111756 A1 * 8/2002 Modgil ........................ 702/63

FOREIGN PATENT DOCUMENTS

JP 05-328451 * 10/1993
JP 5-328451 12/1993
JP 11-53091 2/1999

* cited by examiner

*Primary Examiner*—Lana Le
(74) *Attorney, Agent, or Firm*—Wenderoth, Lind & Ponack, L.L.P.

(57) ABSTRACT

A remote control receiving circuit for receiving a remote control signal from a transmitter includes a header interrupt generation circuit that outputs a header interrupt signal when detecting the header of the signal, a data interrupt generation circuit that outputs a data interrupt signal when the header has been detected and the predetermined data receiving is completed, and a switch that selects the header interrupt signal or data interrupt signal in accordance with an instruction of the CPU. A CPU has one interrupt port for receiving the interrupt signal selected by the switch, and performs control in accordance with the received interrupt signal. Therefore, a remote control receiving system can reduce the codes, processing power, and resources of the CPU, which are used to implement the remote control signal receiving function, and reduce the cost of the entire system.

10 Claims, 24 Drawing Sheets

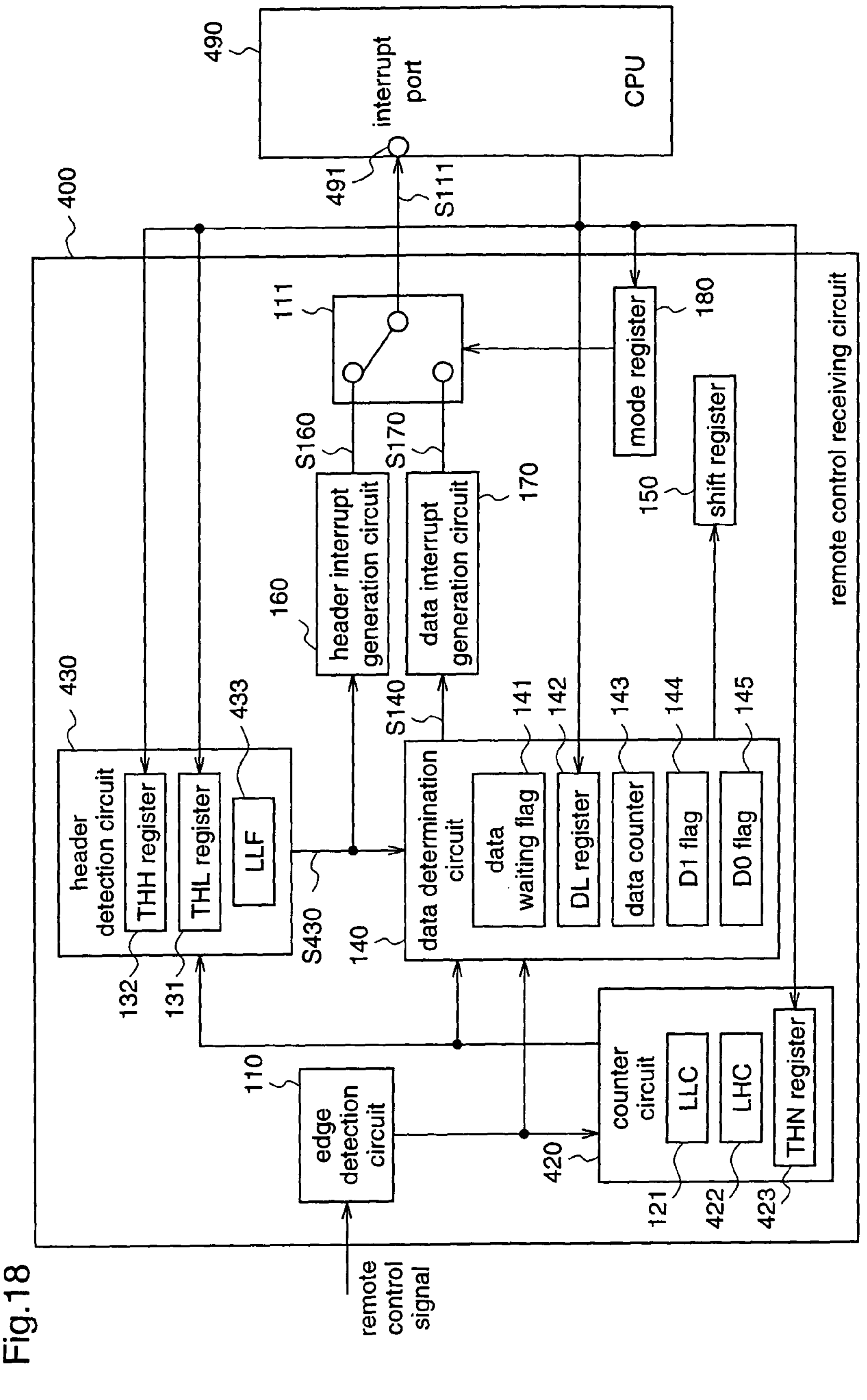
Fig.18
remote control signal
edge detection circuit
110
400
remote control receiving circuit
header detection circuit
THH register
THL register
LLF
430
433
132
131
S430
data determination circuit
data waiting flag
DL register
data counter
D1 flag
D0 flag
140
141
142
143
144
145
S140
counter circuit
LLC
LHC
THN register
420
121
422
423
header interrupt generation circuit
160
data interrupt generation circuit
170
S160
S170
111
mode register
180
shift register
150
S111
491
interrupt port
CPU
490

REMOTE CONTROL RECEIVING SYSTEM

FIELD OF THE INVENTION

The present invention relates to a remote control receiving system that is provided in equipment to be controlled by a remote control and, more particularly, to a remote control receiving system that lightens processing loads or resource loads imposed on a CPU in the remote control receiving system.

BACKGROUND OF THE INVENTION

In the equipment controlled by a remote control, functions which are required on the receiving end that receives a remote control signal outputted from a transmitter are a receiving function of correctly demodulating the remote control signal into data, and a decoding function of decoding the demodulated data to obtain information of the request.

Initially, a remote control signal that is outputted from a remote control is described with reference to FIGS. 21 and 22. FIGS. 21(*a*) and 21(*b*) are diagrams showing examples of a remote control signal that is outputted from a remote control.

As shown in FIG. 21(*a*), a remote control signal described herein is composed of a header part indicating that it is followed by a remote control signal, a data part that represents a bit string of data indicating a depressed remote control button with combination of duration of Low (hereinafter, referred to as "LongLow") and duration of High (hereinafter, referred to as "LongHigh") in the remote control signal, and a trailer part notifying the end of the data.

In FIG. 21(*a*), a portion of the signal in which a duty between LongLow and LongHigh in the data part is 1:1 corresponds to data "0", while a portion in which the duty is 1:3 corresponds to data "1". It is assumed that there are data patterns at least as many as the number of remote control buttons.

As the transmitters that output the remote control signal, there are two kinds of transmitters that output remote control signals as shown in FIGS. 22(*a*) and 22(*b*), respectively. The first one is a repeat-header type transmitter as shown in FIG. 22(*a*) which, when the same remote control button is continuously depressed, outputs a waveform including a data part as shown in FIG. 21(*a*) only at the first time, and thereafter outputs a waveform as shown in FIG. 21(*b*), which is composed of a repeat header part and a trailer part, without including a data part, as long as the same remote control button is continuously depressed. The second one is a repeated-data type transmitter as shown in FIG. 22(*b*), which repeatedly outputs a waveform including a data part as shown in FIG. 21(*a*) while the remote control button is depressed.

Then, descriptions will be given of the decoding function and the receiving function which are required at the receiving end that receives the remoter control signal.

Since the decoding function requires a flexible correspondence between the demodulated data and the information of the request, it is desirable that the decoding function should be implemented by a CPU. On the other hand, the receiving function on the receiving end is conventionally implemented by one of following two methods.

In one of the methods, a remote control signal that is outputted from a transmitter is directly inputted into a CPU on the receiving end, then edges of the remote control are utilized as interrupt triggers, and the interval of the interrupts is counted by a timer (not shown) included in the CPU, whereby the receiving function is implemented by the CPU.

However, when this first method is employed, the CPU carries out all processes for determining the remote control signal, such as detection of a header part, 0/1 determination for data, and detection of trailer parts, and consequently, the CPU must perform quite complicated software processing, whereby the number of program steps in the CPU is unfavorably increased.

Further, in this first method, as the edges of the remote control signal are handled directly as interrupt signals for the CPU, the interrupts resulting from the remote control signal occur quite frequently at the depression of the remote control button. These interrupts resulting from the remote control signal have strict real-time requirements and must be assigned a higher priority than the other interrupts, because the interval of interrupts occurring in the CPU must be correctly counted by the timer, to determine the remote control signal. Therefore, when the first method is employed, the interrupts having higher priorities occur quite frequently in the CPU, and accordingly, the processing for a system that is to be controlled by the CPU may be oppressed, so that the operation may be delayed.

Accordingly, a second method for implementing the remote control signal receiving function has been conventionally employed. In this second method, a remote control receiving circuit for receiving an inputted remote control signal and performing part or all of the demodulation process such as the detection of a header part or the detection of a data part, is provided on the receiving end that receives the remote control signal, thereby to reduce the number of occurrences of the interrupts resulting from the remote control signal and lighten the processing loads on the CPU (see Japanese Published Patent Application No. Hei. 5-328451, No. Hei. 11-53091, and U.S. Pat. No. 5,752,184).

Hereinafter, a remote control receiving system that implements the remote control signal receiving function according to the second method, i.e., by using a remote control receiving circuit will be described with reference to FIGS. 23 and 24. It is assumed that remote control signals as shown in FIG. 21 are inputted to the remote control receiving circuit.

Initially, a construction of a conventional remote control receiving system at the receiving end will be described with reference to FIG. 23. FIG. 23 is a diagram illustrating the construction of a conventional remote control receiving system.

In FIG. 23, the conventional remote control receiving system is constituted by a remote control receiving circuit 500 that receives a remote control signal transmitted from a transmitter (not shown), and a CPU 590 that controls the remote control receiving circuit 500 and decodes the remote control signal. The remote control receiving circuit 500 comprises an edge detection circuit 510 that detects edges of the received remote control signal, a counter circuit 520 that counts the interval of the edges which are detected by the edge detection circuit 510, a header detection circuit 530 that receives the output from the counter circuit 520 and detects an header part in the remote control signal, a header interrupt generation circuit 560 that generates a header interrupt signal S560 notifying the CPU 590 that the header part of the remote control signal is detected, a data determination circuit 540 that determines 0/1 of a data part following the header part in the remote control signal on the basis of the output from the counter circuit 520 and stores the data in an internal register 550, a data interrupt generation circuit 570 that generates a data interrupt signal S570 notifying the CPU

590 that the data part of the remote control signal is detected, when data as much as the number of bits corresponding to the data part in the remote control signal are stored in the internal register 550, and a trailer detection circuit 580 that receives the output from the counter circuit 520, then detects a trailer part in the remote control signal, and notifies the CPU 590 that the trailer part of the remote control signal is detected. Here, the remote control receiving circuit 500 does not have to include all of the above-mentioned circuits, but may be constituted by a part of the aforementioned remote control receiving circuit, including the edge detection circuit 510, the counter circuit 520, and the data determination circuit 540. For example, the remote control receiving circuit 500 may be constituted by the edge detection circuit 510, the counter circuit 520, the data determination circuit 540, and the data interrupt generation circuit 570.

The CPU 590 receives the interrupt signals S560 to S580 which are outputted from the above-mentioned remote control receiving circuit 500, and performs control in accordance with the received interrupt signals. As one interrupt port is employed for one interrupt signal, the CPU 590 includes three interrupt ports 0, 1 and 2 in FIG. 23.

Next, the flow of processing in a case where the conventional remote control receiving system that has the above-mentioned construction receives a remote control signal will be described with reference to FIG. 24. FIG. 24 is a flowchart showing a sequence of operations when the conventional remote control receiving system receives a remote control signal.

When the operation of the remote control receiving circuit is started, the counter circuit 520 and the data determination circuit 540 are first initialized (F2401). While the edge detection circuit 510 does not detect an edge of the remote control signal, the counter circuit 520 continues incrementing (F2402).

When the edge detection circuit 510 detects an edge, the value of the counter circuit 520 at the edge detection is outputted to the header detection circuit 530, the trailer detection circuit 580 and the data determination circuit 540, respectively, and actions according to the value of the counter circuit 520 occur in the respective circuits.

When the counter value is a value indicating a header detection (F2404), the header detection circuit 530 detects the header part, then the header interrupt generation circuit 560 generates a header interrupt signal S560, and header interrupt is outputted to the interrupt port 0 of the CPU 590 (F2405). Thereafter, the counter circuit 520 is initialized (F2406), and waits for the next edge.

When the counter value is a value indicating a data detection (F2407), the data determination circuit 540 determines 0 or 1 of the remote control signal on the basis of the output from the counter circuit 520, and stores the determined data in the internal register 550 (F2408). When data as much as a prescribed number of bits corresponding to the data part have been stored in the internal register 550 (F2409), the data interrupt generation circuit 570 generates a data interrupt signal S570, to issue the data interrupt to the interrupt port 1 of the CPU 590 (F2410). Thereafter, the counter circuit 520 is initialized (F2406). When data as much as the prescribed number of bits have not been stored in the internal register 550 (F2409), the counter circuit 520 is initialized, without the data interrupt signal S570 generated by the data interrupt generation circuit 570 (F2406).

When the counter value is a value indicating a trailer detection (F2411), the trailer detection circuit 580 detects the trailer part of the remote control signal and generates a trailer interrupt signal S580 to be outputted to the interrupt port 2 of the CPU 590 (F2412), and thereafter the counter circuit 520 is initialized (F2406) and waits for the next edge.

However, when the remote control signal receiving function is implemented according to the second method, i.e., by using the above-mentioned conventional remote control receiving circuit 500, following problems occur.

First of all, since the conventional remote control receiving circuit 500 includes the header interrupt generation circuit 560, the trailer detection circuit 580, and the data interrupt generation circuit 570 as shown in FIG. 23, and thus the interrupt signals are outputted from the respective circuits to the CPU 590, the CPU 590 needs to have interrupt ports corresponding to the respective interrupt signals. Therefore, many resources of the CPU 590 are unfavorably expended. In order to overcome this problem, the conventional remote control receiving circuit 500 can be constituted, for example, only by the edge detection circuit 510, the counter circuit 520 and the data determination circuit 540, but in this case the remote control receiving circuit cannot generate the header interrupt. Accordingly, when the remote control receiving circuit 500 receives a remote control signal that is outputted from a repeat-header type transmitter as shown in FIG. 22(*a*), this circuit cannot notify the CPU 590 that the remote control button is continuously depressed, whereby specifications of the remote control signal, which are available in the remote control receiving system are undesirably narrowed.

Secondly, in the conventional remote control receiving circuit 500, following harmful effects may be caused by disturbance of the remote control signal due to noises or the like.

The first case is when a waveform that is identified as a header part is generated by noises.

More specifically, even when a remote control signal that is composed only of a repeat-header part, including no data as shown in FIG. 21(*b*) is detected by the conventional remote control receiving circuit 500 at an impossible timing (such as immediately after start of the remote control operation), the header interrupt generation circuit 560 in the conventional remote control receiving circuit 500 unfavorably generates the header interrupt signal S560, and outputs the header interrupt to the CPU 590. As the header interrupt that is erroneously issued due to noises causes malfunction of the CPU, the CPU 590 must have a code for avoiding the malfunction.

The second case is when a waveform that is identified as a trailer part is generated by noises.

To be more specific, also when the waveform of the remote control signal that is outputted from the transmitter is interrupted due to some disturbance (for example in a situation where a person crosses in front of the transmitter) while the remote control button is depressed, the conventional remote control receiving circuit 500 receives the same waveform as a trailer waveform, and then the trailer detection circuit 580 generates the trailer interrupt signal S580, whereby the trailer interrupt is unfavorably issued to the CPU 590. In the conventional remote control receiving system, the trailer interrupt signal S580 is employed as an interrupt representing a completion of the receiving of the remote control signal, and thus when the trailer interrupt signal is erroneously issued, the CPU 590 may malfunction. Therefore, also for the trailer interrupt signal S580, the CPU 590 must have a code for avoiding the malfunction.

The third case is when data more than the prescribed number of bits are detected due to noises.

More specifically, at the end of the data detection for a data part of the remote control signal, the remote control receiving circuit 500 may receive a waveform that is erroneously identified as data due to noises that occur after waveforms as many as the number of bits which are to be received are received (for example, noises resulting from release of the remote control button). In the conventional remote control receiving circuit 500, the erroneously detected bits are written as data in the internal register 550, even after the data interrupt signal S570 is issued, and thus the data as much as the specified number of bits which have been stored before the issuance of the data interrupt signal S570 may be destroyed. To avoid this, the CPU 590 must read the data stored in the internal register 550 promptly after the data interrupt signal S570 is issued and before the data written in the internal register 550 are destroyed due to the noises. Therefore, the CPU 590 must give a higher priority to the data interrupt, thereby to quickly perform reading of the data after occurrence of the data interrupt.

SUMMARY OF THE INVENTION

The present invention has for its object to provide a remote control receiving system that can reduce the codes, the processing power, the resources, and the like of the CPU, which are utilized to implement the remote control signal receiving function, and can reduce the cost of the entire apparatus.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a remote control receiving system that is constituted by a remote control receiving circuit for receiving a remote control signal having a header part, and a data part corresponding to a remote control button depressed; and a CPU for controlling the remote control receiving circuit to decode the remote control signal received by the remote control receiving circuit, in which the remote control receiving circuit comprises: an edge detection circuit that detects rising edges and falling edges of the remote control signal; a counter circuit that counts a time interval between a rising edge and a falling edge of the remote control signal, and a time interval between a falling edge and a rising edge; a header detection circuit that detects the header part of the remote control signal on the basis of the count value of the counter circuit; a data determination circuit that determines 0 or 1 of the data part in the remote control signal on the basis of the count value of the counter circuit, and stores the determination result in an internal register; a header interrupt generation circuit that outputs a header interrupt signal notifying detection of the header part in the remote control signal to the CPU, when the header part of the remote control signal is detected by the header detection circuit; a data interrupt generation circuit that outputs a data interrupt signal notifying data receiving completion for the remote control signal to the CPU, when data corresponding to the number of bits, which number has been previously specified by the CPU, are stored in the internal register by the data determination circuit after the header part of the remote control signal is detected by the header detection circuit; and a switch that selects one of the header interrupt signal and the data interrupt signal, in accordance with an instruction of the CPU, and the CPU has one interrupt port, and receives the interrupt signal through the switch of the remote control receiving circuit, thereby controlling the remote control receiving circuit in accordance with the received interrupt signal, and determining that the remote control button is released when the interrupt signal from the switch is not received during a predetermined time period. Therefore, the CPU requires only one interrupt port to implement the remote control receiving function, thereby reducing the resources of the CPU, and further no trailer interrupt is issued, whereby the remote control receiving circuit can be downsized, as well as codes or processing loads on the CPU for handling the trailer interrupt can be reduced.

According to a 2nd aspect of the present invention, in the remote control receiving system according to the 1st aspect, the CPU instructs the switch to select the data interrupt signal at start of the operation of the remote control receiving system or at detection of release of the remote control button. Therefore, even when the remote control receiving circuit detects an error header that is caused by noises, a header interrupt resulting from the error header is not issued to the CPU, whereby the processing loads on the CPU due to an unfavorable interrupt that is caused by the noises can be reduced.

According to a 3rd aspect of the present invention, in the remote control receiving system of the 1st aspect, when the remote control receiving circuit receives the remote control signal that has the header part and the data part, and successively receives a remote control signal that is composed only of a repeat header part without including the data part, the CPU instructs the switch to select the data interrupt signal at start of the operation of the remote control receiving system, then instructs to select the header interrupt after receiving the data interrupt signal from the remote control receiving circuit through the interrupt port, and instructs to select the data interrupt signal again when release of the remote control button is detected. Therefore, the CPU can detect the continuous depression of the remote control button, thereby carrying out the processing corresponding to the continuously depressed button.

According to a 4th aspect of the present invention, in the remote control receiving system of the 1st aspect, after the data corresponding to the number of bits, which number has been previously specified by the CPU, are stored in the internal register, the data determination circuit does not update the data that are stored in the internal register until the header detection circuit detects the next header part. Therefore, even when the remote control receiving circuit receives data more than the number of bits, which has been previously specified by the CPU, the data which are stored in the internal register can be held. Consequently, the CPU can have enough time for reaction from when a data interrupt occurs to when the CPU obtains the data stored in the internal register, whereby the priority for the interrupt port of the CPU can be lowered.

According to a 5th aspect of the present invention, in the remote control receiving system of the 1st aspect, when receiving the next header part before the data corresponding to the number of bits, which has been previously specified by the CPU are stored in the internal register, the data determination circuit gives a higher priority to detection of the next header part in the header detection circuit. Therefore, even when the remote control signal is interrupt for some reasons while a data part of the remote control signal is being received, and the header part of the next remote control signal is received before data corresponding to the preset number of bits are stored in the internal register, a higher priority is given to the detection of the header part, and the system can proceed to a data waiting status for waiting a new data part following the header part. Consequently, in this remote control receiving system, even when an accident happens and part of the data in the remote control signal are missed, the processing can be continued without putting loads on the CPU.

According to a 6th aspect of the present invention, in the remote control receiving system of the 1st aspect, when the data part of the remote control signal is composed of a main data part, and an inverted data part that is obtained by inverting 0 and 1 of the main data part, the remote control receiving circuit includes a validity determination circuit that compares the main data part and the inverted data part of data stored in the internal register with each other, and determines the data to be valid when all of corresponding bits have different values while determining the data to be invalid in other cases, and the data interrupt generation circuit outputs the data interrupt signal when the data corresponding to the number of bits, which has been previously specified by the CPU, are stored in the internal register by the data determination circuit, and the data stored in the internal register are determined to valid by the validity determination circuit, after the header part of the remote control signal is detected by the header detection circuit. Therefore, when data stored in the internal register are error data, a data interrupt is not issued to the CPU, whereby the processing loads on the CPU resulting from an unfavorable interrupt caused by the error data can be reduced. Further, when the remote control button is continuously depressed in the case where the data in the internal register are error data, a repeat header part follows the error data, but when the validity of the data in the internal register is determined as described above, issuance of a data interrupt caused by the error data and a header interrupt resulting from the repeat header following the error data to the CPU can be avoided, thereby further reducing the needless processing in the CPU.

According to a 7th aspect of the present invention, in the remote control receiving system according to the 1st aspect, the remote control receiving circuit includes an OFF detection circuit that makes an OFF flag rise when detecting that a logic level specified by the CPU continues for a longer time period than a period that has been previously specified by the CPU, on the basis of the count value of the counter circuit, and the CPU judges that the remote control button is released when the OFF flag rises. Therefore, the release of the remote control button can be detected without utilizing the internal timer in the CPU, and consequently the remote control receiving function can be implemented with much less resources of the CPU.

According to an 8th aspect of the present invention, in the remote control receiving system according to the 1st aspect, in a case where the header part of the remote control signal is composed of a waveform that keeps a certain logic level for a prescribed time period, and a waveform that keeps an opposite logic level for a prescribed time period, when the counter circuit detects a change in the logic level during a time period that has been previously specified by the CPU while the remote control receiving circuit is receiving a header part of the remote control signal, the counter circuit ignores the change in the logic level during the time period as a noise, and starts counting from a count value before the logic level changes. Therefore, influences of noises at a time when a header part of the remote control signal is detected by the remote control receiving circuit can be lessened.

According to a 9th aspect of the present invention, in the remote control receiving system according to the 6th aspect, the remote control receiving circuit includes: an OFF counter that continues to count up until a time period that has been previously specified by the CPU expires, and is reset when one of two conditions, which is specified by the CPU, that the header part of the remote control signal is detected by the header detection circuit, or that data corresponding to the number of bits, which has been previously specified by the CPU, are stored in the internal register by the data determination circuit and the data stored in the internal register are determined to be valid by the validity determination circuit, is met; and an OFF detection circuit that makes an ON flag rise when the OFF counter is reset, and makes the ON flag fall when the count value of the OFF counter and the period that has been previously specified by the CPU become equal to each other, and the CPU judges that the remote control button is released when the ON flag falls. Therefore, the release of the remote control button can be detected without utilizing the internal timer of the CPU, and consequently the remote control receiving function can be implemented with much less resources of the CPU. Further, as the remote control receiving circuit is provided with the OFF counter, influences of noises at a time when the release of the remote control button is be detected can be lessened.

According to a 10th aspect of the present invention, there is provided a remote control receiving system that is constituted by a remote control receiving circuit for receiving a remote control signal having a header part, and a data part corresponding to a remote control button depressed; and a CPU for controlling the remote control receiving circuit to decode the remote control signal received by the remote control receiving circuit, wherein when the data part of the remote control signal is composed of a main data part, and an inverted data part that is obtained by inverting 0 and 1 of the main data part, the remote control receiving circuit comprises: an edge detection circuit that detects rising edges and falling edges of the remote control signal; a counter circuit that counts a time interval between a rising edge and a falling edge of the remote control signal, and a time interval between a falling edge and a rising edge; a header detection circuit that detects the header part of the remote control signal on the basis of the count value of the counter circuit; a data determination circuit that determines 0 or 1 of the data part in the remote control signal on the basis of the count value of the counter circuit, and stores the determination result in an internal register; a validity determination circuit that compares the main data part and the inverted data part of the data stored in the internal register with each other, and determines the data to be valid when all of corresponding bits have different values while determining the data to be invalid in other cases; an OFF counter that continues to count up until a time period that has been previously specified by the CPU expires, and is reset when one of two conditions, which is specified by the CPU, that the header part of the remote control is detected by the header detection circuit, or that data corresponding to the number of bits, which number has been previously specified by the CPU, are stored in the internal register by the data determination circuit and the data stored in the internal register are determined to be valid by the validity determination circuit, is met, an OFF detection circuit that makes the ON flag rise when the OFF counter is reset, and makes the ON flag fall when the time period that has been previously specified by the CPU and the count value of the OFF counter become equal to each other; and a data header flag that is set when the OFF counter is reset, and is reset by the CPU, and the CPU reads the value of the data header flag and the value of the ON flag in prescribed timings, respectively, and controls the remote control receiving circuit in accordance with the read values. Therefore, the remote control receiving function can be implemented by the CPU, with utilizing no interrupt port, whereby the resources of the CPU for the remote control receiving function can be further reduced.

BRIEF DESCRIPTION OF THE DRAWINGS

FIG. 18 is a diagram illustrating a construction of a remote control receiving system according to a fourth embodiment of the present invention.

DETAILED DESCRIPTION OF THE PREFERRED EMBODIMENTS

Figure 21:
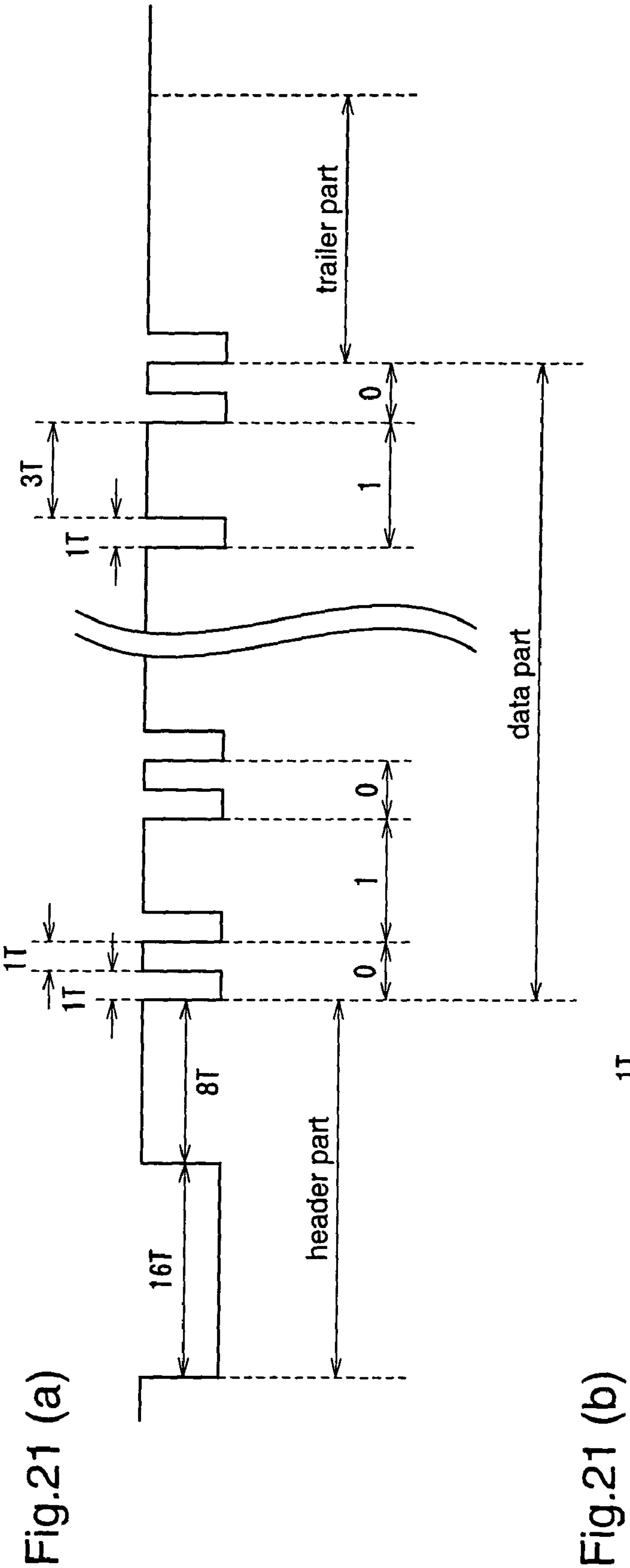
FIGS. 21(*a*) and 21(*b*) are waveform charts showing examples of a waveform of a remote control signal, FIG. 21(*a*) being a waveform diagram showing a repeat-header part.
Figure 21:
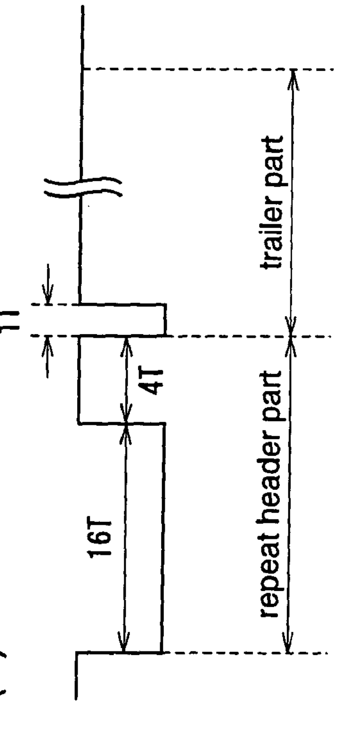

Embodiments for carrying out the present invention will be specifically described hereinafter. It is assumed that any of remote control receiving circuits according to all embodiments shown below receives the above-mentioned remote control signals shown in FIGS. 21 and 22, and a data part of the remote control signal is composed of 32 bits.

EMBODIMENT 1

A remote control receiving circuit and a remote control receiving system according to a first embodiment of the present invention will be described with reference to FIGS. 1 to 5.

Figure 1:
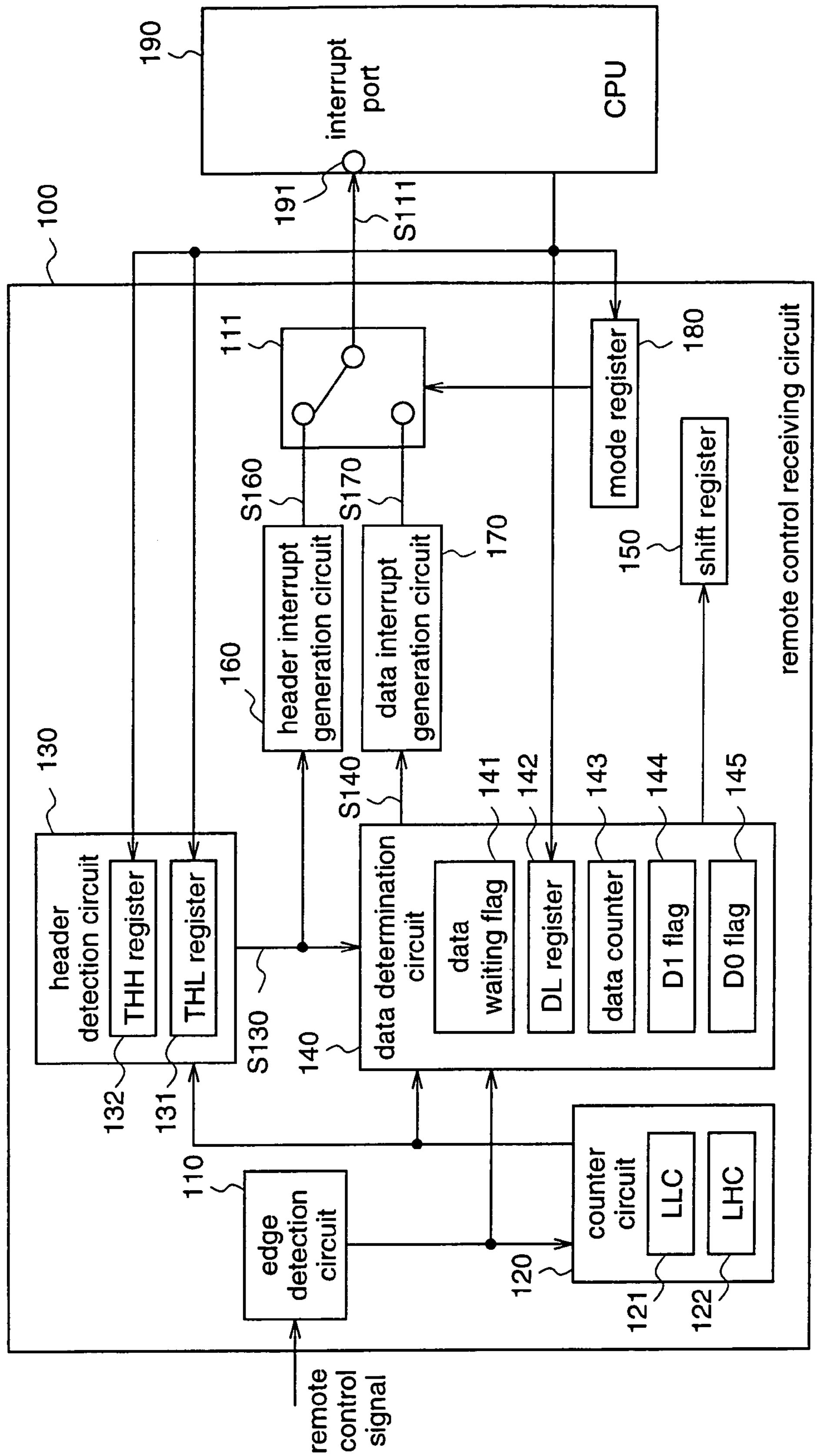
FIG. 1 is a diagram illustrating a construction of a remote control receiving system according to a first embodiment of the present invention.

Initially, a construction of the remote control receiving system according to the first embodiment will be described with reference to FIG. 1. FIG. 1 is a diagram illustrating a construction of the remote control receiving system according to the first embodiment.

In FIG. 1, the remote control receiving system according to the third embodiment is constituted by a remote control receiving circuit 100 that receives a remote control signal that is outputted from a transmitter (not shown), and a CPU 190 that sets arbitrary values in various registers of the remote control receiving circuit 100 to control the remote control receiving circuit 100, and decodes the remote control signal. The remote control receiving circuit 100 comprises an edge detection circuit 110, a counter circuit 120, a header detection circuit 130, a data determination circuit 140, a shift register 150, a header interrupt generation circuit 160, a data interrupt generation circuit 170, a mode register 180, and a switch 111. The CPU 190 is provided with an interrupt port 191 for receiving an interrupt signal S111 from the remote control receiving circuit 100, as an interrupt port that is required to implement a remote control receiving function.

Hereinafter, the construction of the remote control receiving circuit 100 will be described in more detail.

The edge detection circuit 110 is connected with the counter circuit 120 and the data determination circuit 140. This edge detection circuit 110 detects a rising edge and a falling edge of a received remote control signal, and notifies the counter circuit 120 and the data determination circuit 140 of the detected edge.

The counter circuit 120 includes a LongLow counter (hereinafter, referred to as LLC) 121 and a LongHigh counter (hereinafter, referred to as LHC) 122, and is connected with the edge detection circuit 110, the header detection circuit 130, and the data determination circuit 140. The LLC 121 in the counter circuit 120 resets a count value to start counting at a falling edge, and then stops the counting at a rising edge, in accordance with the edge detection notification from the edge detection circuit 110. The LHC 122 in the counter circuit 120 starts counting at a rising edge, stops the counting at a falling edge, and then resets the count value.

The header detection circuit 130 includes a LongLow threshold register (hereinafter, referred to as a THL register) 131 and a LongHigh threshold register (hereinafter, referred to as a THH register) 132, and is connected with the counter circuit 120, the data determination circuit 140, and the header interrupt generation circuit 160. Here, the THL register 131 and the THH register 132 in the header detection circuit 130 are registers whose values can be set by the CPU 190. A threshold value for a Low section in the header part of the remote control signal is set in the THL register 131, while a threshold value for a High section in the header part is set in the THH register 132. The header detection circuit 130 outputs a header detection signal S130 having a value of "1" to the data determination circuit 140 and the header interrupt generation circuit 160 when the output value from the LLC 121 in the counter circuit 120 is larger than the set value in the THL register 131 and the output value from the LHC 122 in the counter circuit 120 is larger than the set value in the THH register 132, and in other cases outputs the header detection signal S130 having a value of "0".

The header interrupt generation circuit 160 is connected with the header detection circuit 130 and the data determination circuit 140, and further connected with the interrupt port 191 of the CPU 190 through the switch 111. When detecting a rising edge of the header detection signal S130 from the header detection circuit 130, the header interrupt generation circuit 160 outputs a pulse of one cycle to the switch 111 once as a header interrupt signal S160.

The data determination circuit 140 includes a data waiting flag 141, a data length register (hereinafter, referred to as a DL register) 142, a data counter 143, a D1 flag 144, and a D0 flag 145, and is connected with the counter circuit 120, the shift register 150, and the data interrupt generation circuit 170. The DL register 142 in the header determination circuit 140 is a register whose value can be set by the CPU 190. The data waiting flag 141 in the data determination circuit 140 is set to "1" when a falling edge of the header detection signal S130 is detected, and cleared back to "0" when the set value of the DL register 142 and the output value from the data counter 143 become equal to each other. The data counter 143 in the data determination circuit 140 is reset when a rising edge of the header detection signal S130 from the header detection circuit 130 is detected, and incremented when the shift register 150 is shifted by one bit. The D0 flag 145 in the data determination circuit 140 is set to "1" when the data waiting flag 141 has a value of "0" and the output value from the LHC 122 in the counter circuit 120 has a value of "1", while being reset to "0" in one of cases where the data waiting flag 141 has a value of "0", where a rising edge is detected by the edge detection circuit 110, where the output value of the LHC 122 in the counter circuit 120 exceeds 2T, and where rising of the header detection signal S130 from the header detection circuit 130 is detected. The D1 flag 145 is set to "1" when the data waiting flag 141 has a value of "1" and the output value of the LHC 122 in the counter circuit 120 exceeds 2T, while being reset to "0" in one of cases where the data waiting flag 141 has a value of "0", where a rising edge is detected by the edge detection circuit 110, and where a rising edge of the header detection signal S130 from the header detection circuit 130 is detected. Further, when the data determination circuit 140 is notified by the edge detection circuit 110 of detection of a falling edge, and then when the D0 flag 145 in the data determination circuit 140 has a value of "1", the shift register 150 is shifted by one bit to add "0", while when the D1 flag 144 in the data determination circuit 140 has a value of "1", the shift register 150 is shifted by one bit to add "1". When the set value of the DL register 142 in the data determination circuit 140 and the output value from the data counter 143 become equal to each other, the data determination circuit 140 determines that data corresponding to a data part of the remote control signal have been written in the shift register 150, and then outputs a data receiving completion signal S140 having a value of "1" to the data interrupt generation circuit 170, and in other cases outputs the data receiving completion signal S140 having a value of "0".

The data interrupt generation circuit 170 is connected with the data determination circuit 140, and further connected with the interrupt port 191 of the CPU 190 through the switch 111. When detecting a rising edge of the data receiving completion signal S140 from the data determination circuit 140, the data interrupt generation circuit 170 outputs a pulse of one cycle to the switch 111 once as a data interrupt signal S170.

The mode register 180 is a register whose value can be set by the CPU 190, and is connected with the switch 111. The switch 111 connects the header interrupt generation circuit 160 and the CPU 190 when the mode register 180 is set to "0", while the switch 111 connects the data interrupt generation circuit 160 and the CPU 190 when the mode register 180 is set to "1".

Figure 2:
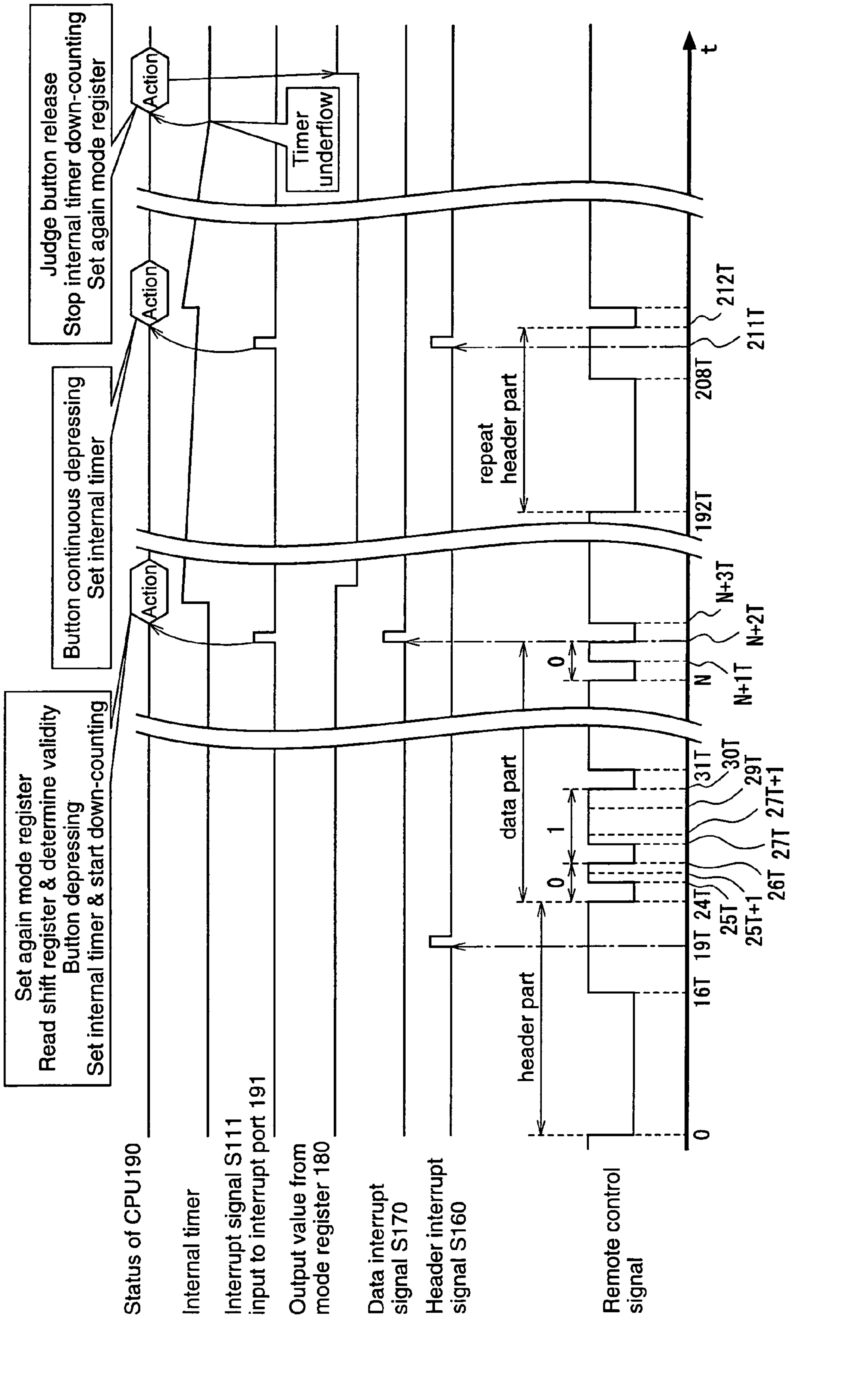
FIG. 2 is a timing chart for a remote control circuit and a CPU in a case where a remote control signal that is outputted from a repeat-header type transmitter is received by the remote control receiving system according to the first embodiment.
Figure 3:
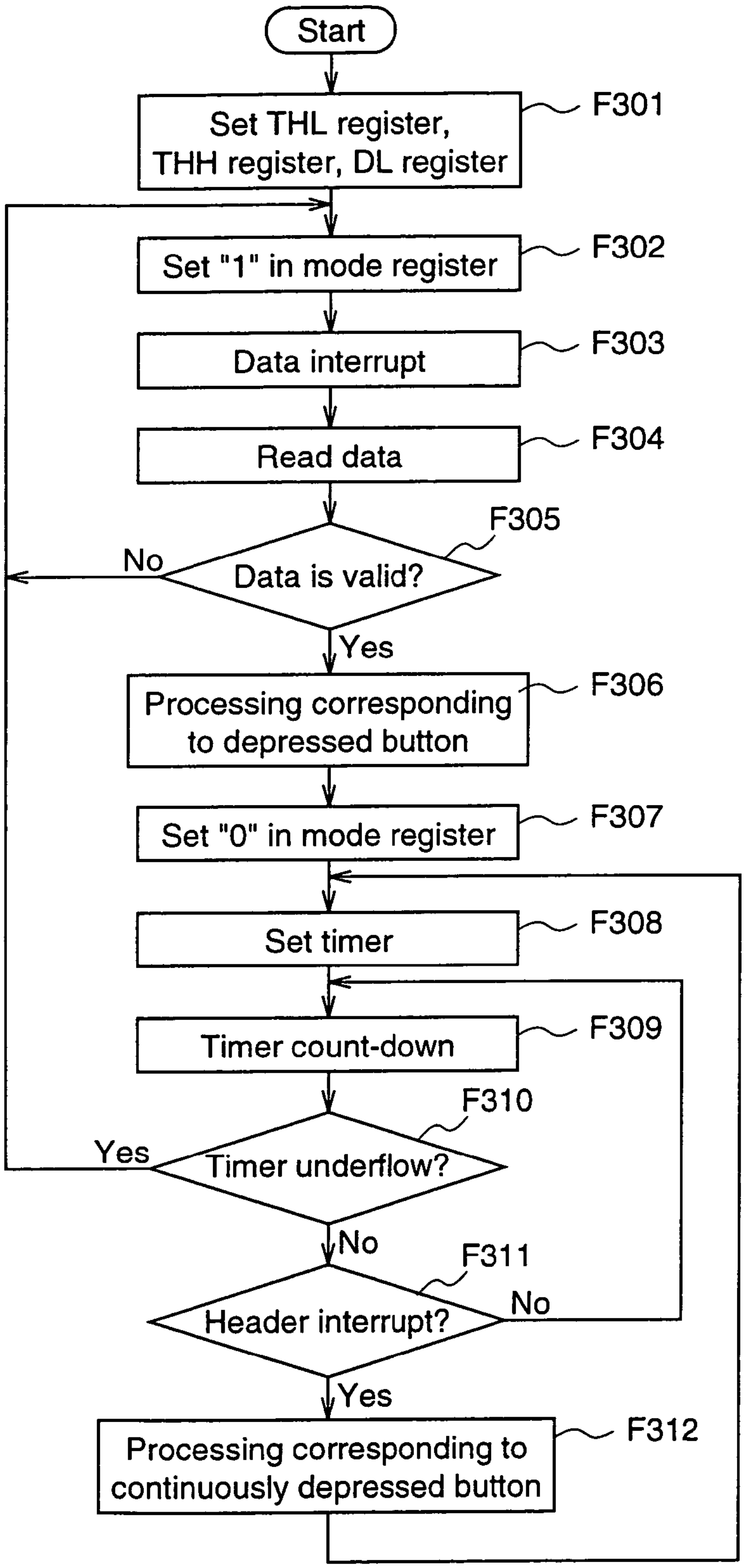
FIG. 3 is a flowchart showing processing on the CPU side according to the first embodiment in a case where a remote control signal that is outputted from a repeat-header type transmitter is received.
Figure 4:
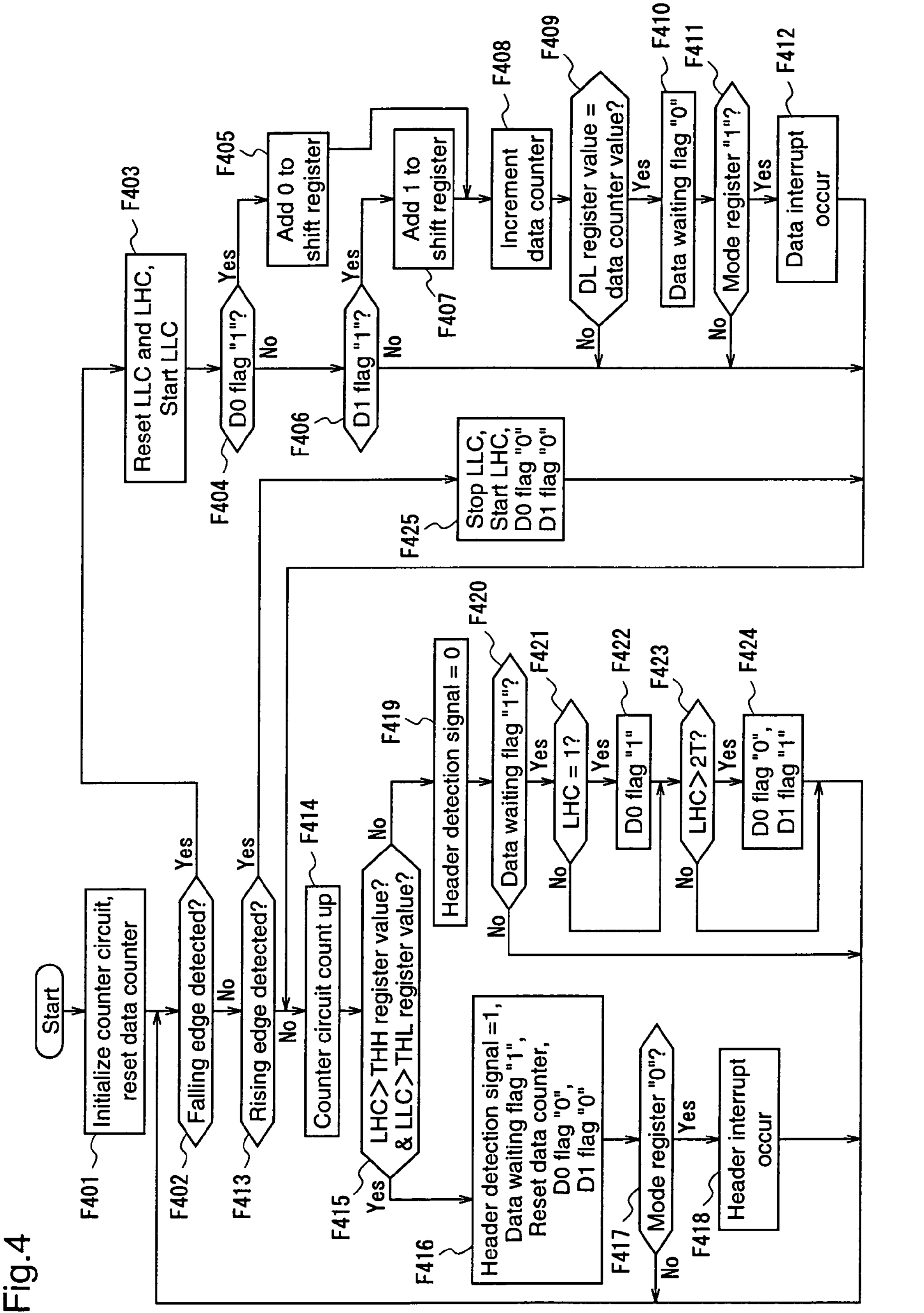
FIG. 4 is a flowchart showing processing in the remote control receiving circuit according to the first embodiment in a case where a remote control signal that is outputted from a repeat-header type transmitter is received.

Next, the flow of operations in the remote control receiving system that has the above-mentioned construction in a case where a remote control signal that is outputted from a repeat-header type transmitter is received will be described with reference to FIGS. 2 to 4. FIG. 2 is a timing chart showing the remote control receiving circuit and the CPU in a case where a remote control signal that is outputted from a repeat-header type transmitter is received by the remote control receiving system according to the first embodiment. FIG. 3 is a flowchart showing processing on the CPU side according to the first embodiment in a case where a remote control signal that is outputted from a repeat-header type transmitter is received. FIG. 4 is a flowchart showing processing in the remote control receiving circuit according to the first embodiment in a case where a remote control signal that is outputted from a repeat-header type transmitter is received.

Initially, at the start of the operation, the CPU 190 sets values of the THL register 131 and the THH register 132 in the header detection circuit 130, the DL register 142 in the data determination circuit 140, and the mode register 180 (F301 and F302). Hereinafter, the values set in the respective registers are specifically described.

As the value set in the THL register 131 in the header detection circuit 130 is used as a threshold value for detecting a Low section in the header part of the remote control signal, an appropriate value that is smaller than 16T corresponding to the Low section in a repeat header is set in the register 131. In this case, the THL register 131 is set to 6T. In addition, as the value set in the THH register 132 is used as a threshold value for detecting a High section in the header part of the remote control signal, an appropriate value that is smaller than 4T corresponding to the High section in the repeat header is set in the register 132. In this case, the THH register 132 is set to 3T. The data length of the data part is set in the DL register 143. In this case, a value of 32 is set in the DL register 143. Then, "1" is set in the mode resister 180 so as to connect the data interrupt generation circuit 170 and the CPU 190 with each other.

After the appropriate values are set in the respective registers in the above-mentioned manner, the CPU 190 waits for issuance of a data interrupt from the remote control receiving circuit 100.

On the remote control receiving circuit 100 side, the counter circuit 120 and the data counter 143 in the data determination circuit 140 are initialized at the start of the operation (F401).

When a button of the remote control is depressed, initially the header part of the remote control signal reaches the remote control receiving circuit 100. It is assumed that the edge detection circuit 110 detects the first falling edge of the header part at time 0 (F402). Then, at time 0, the LLC 121 and the LHC 122 in the counter circuit 120 are reset (F403). Since the D0 flag 145 and the D1 flag 144 in the data determination circuit 140 are both "0" at this time (F404 and F406), only the counter circuit 120 counts up without the data being stored in the shift register 150 (F414).

Then, at time 6T, the output value from the LLC 121 that counts the Low section in the header part of the remote control signal exceeds the value of the THL register 131.

At time 16T, a rising edge is detected (F413), then the LLC 121 in the counter circuit 120 counts to 16T and stops counting, and the LHC 122 starts counting (F425).

At time 19T, the output value of the LHC 122 exceeds the set value in the THH register 132 in the header detection circuit 130. At that time, as the output value of the LLC 121 in the counter circuit 120 is held at 16T, the output value is larger than the set value in the THL register (F415). Therefore, in this case, the header detection circuit 130 outputs the header detection signal S130 having a value of "1" to the data determination circuit 140 and the header interrupt generation circuit 160.

When detecting this rising edge of the header detection signal S130, the data determination circuit 140 resets the data counter 143 in the data determination circuit 140, sets the data waiting flag to "1", and further resets the D0 flag 145 and the D1 flag 144 to "0" (F416). As described above, in this remote control receiving system, the step of comparing the values which are set in the THH register 132 and the THL register 131 in the header detection circuit 130, and the values of the LHC 122 and the LLC 121 of the counter circuit 120, respectively, (F415 in FIG. 4) is carried out each time a rising edge or a falling edge is detected, and when the condition of F415 is satisfied, it is judged that the header part of the remote control signal is detected, and then the header detection signal is set at "1", as well as the data counter 143 in the data determination circuit 140 is reset regardless of the number of bits corresponding to data stored in the shift register 150 at that time (F416 in FIG. 4). This indicates that the remote control system gives a higher priority to the header detection than the data waiting status. In other words, when receiving 30 bits of data in a data part of the remote control signal and then receiving the header part of the next remote control signal while waiting for remaining 2 bits, this remote control receiving circuit abandons the 30-bit data stored in the shift register 150, and carries out the processing for the header part and a data part in the next remote control signal. By giving the higher priority to the header detection in this way, even when signals from the remote control are interrupted because someone passes through between a transmitter (remote control) and a receiver (remote control receiving circuit), when receiving the header part of the next remote control signal, the remote control receiving circuit can return from the data waiting status for waiting remaining 2 bits which would never come, to the header part detection processing, not under the control of the CPU but by itself.

Then, when detecting the rising edge of the header detection signal S130, the header interrupt generation circuit 160 outputs a pulse of one cycle once as a header interrupt signal S160. However, since the value of the mode register 180 is "1" at that time, the header interrupt generation circuit 160 is not connected to the interrupt port 191 of the CPU 190, whereby the header interrupt signal S160 is not notified to the CPU 190 (F417).

At time 24T, the edge detection circuit 110 detects a falling edge (F402), then the LLC 121 and the LHC 122 in the counter circuit 120 are both reset (F403), and consequently the respective values of the LLC 121 and the LHC 122 become lower than the values of the THL register 131 and the THH register 132 in the header detection circuit 130 (F415), whereby the header detection signal S130 having a value of "0" is outputted (F419). Since the value of the data waiting flag 141 in the data determination circuit 140 is "1" at this time (F420), the D1 flag 144 and the D0 flag 145 in the data determination circuit 140 can be set.

At time 25T, the edge detection circuit 110 detects a rising edge (F413), and the LLC 121 in the counter circuit 120 counts to 1T and stops counting (F425).

At time 25T+1, the output value from the LHC 122 in the counter circuit 120 becomes equal to "1". At this time, as the data waiting flag 141 in the data determination circuit 140 is "1" and the LHC 122 in the counter circuit 120 reaches "1" (F421), the D0 flag 145 in the data determination circuit 140 is set to "1" (F422).

When the edge detection circuit 110 detects a falling at time 26T (F402), the data determination circuit 140 is notified of the falling edge by the edge detection circuit 110 in a situation where the D0 flag 145 is "1", and accordingly the LLC 121 and the LHC 122 in the counter circuit 120 are reset (F403), as well as the shift register 150 is shifted by one bit to add "0" to the shift register 150 (F405). At this time, the data counter 143 is incremented to "1" (F408). Since at this time the value of the data counter 143 does not reach the specified number of bits yet (F409), the counter circuit 120 counts up (F414).

At time 27T, the edge detection circuit 110 detects a rising edge (F413), and the D0 flag 145 and the D1 flag 144 in the data determination circuit 140 are both reset to "0" (F425).

Then, at time 27T+1, the D0 flag 145 is set to "1" in the same manner as the above-mentioned operation at the time 25T+1 (F422).

At time 29T, the LHC 122 in the counter circuit 120 counts to 2T, the value of the data waiting flag 141 is "1", and the LHC 122 in the counter circuit 120 reaches "2T" (F420, F421, and F423). Therefore, the D0 flag 145 is set to "0" and the D1 flag 144 is set to "1" (F424).

At time 30T, the edge detection circuit 110 detects a falling edge (F402). At that time, the LLC 121 and the LHC 122 in the counter circuit 120 are reset (F403). Then, since the data determination circuit 140 is notified of the falling edge detection by the edge detection circuit 110 in a situation where the D1 flag 144 is "1" (F406), the shift register 150 is shifted by one bit to add "1" to the shift register 150 (F407). At that time, the data counter 143 is incremented to "2" (F408). As the value of the data counter 143 does not reach the specified number of bits yet at that time (F409), the counter circuit 120 counts up thereafter (F414).

When the edge detection circuit 110 detects a rising edge at time 31T (F413), the D0 flag 145 and the D1 flag 144 in the data determination circuit 140 are both reset to "0" (F425). Hereinafter, data in the data part of the remote control signal are stored in the shift register 150, bit by bit, in the above-mentioned manner.

Thereafter, the above-mentioned operations are repeated. Assuming that the output value of the data counter 143 in the data determination circuit 140 is incremented to "31" at time N, the edge detection circuit 110 detects a rising edge at time N+1T, and detects a falling edge at time N+2T (F402). Then, "0" is added to the shift register 150 (F405), the output value of the data counter 143 in the data determination circuit 140 is incremented to "32" (F408), and accordingly the value of the data counter 143 in the data determination circuit 140 and the set value in the DL register 142 become equal to each other (F409). At that time, the data waiting flag 141 in the data determination circuit 140 is reset to "0" (F410), while at the same time the data receiving completion signal S140 having a value of "1" is outputted from the data determination circuit 140 to the data interrupt generation circuit 170.

When detecting a rising of the data receiving completion signal S140, the data interrupt generation circuit 170 outputs a pulse of one cycle once as a data interrupt signal S170. As the value of the mode register 180 is "1" at that time (F411), the data interrupt generation circuit 170 and the CPU 190 are connected through the switch 111. Therefore, an interrupt signal S111 that is the data interrupt signal S170 is outputted to the interrupt port 191 of the CPU 190, whereby data interrupt occurs (F412).

The CPU 190 receives the interrupt signal S111 from the remote control receiving circuit 100 (F303), and reads the value of the shift register 150 (F304). Then, the CPU 190 evaluates the validity of the data read from the shift register 150 (F305), and returns to F302 when the data is invalid, while obtaining information of the depressed button to start the corresponding processing when the data read from the shift register 150 is valid (F306). The evaluation of the validity of data is performed to check whether this is data corresponding to the depressed button or not. When this is not the corresponding data, the data is determined to be invalid in the evaluation, while when this is the corresponding data, the data is determined to be valid.

Thereafter, the CPU 190 sets "0" in the mode register 180 (F307), then sets an arbitrary value M in a timer (not shown) included in the CPU 190 (F308), thereby starting down-counting of the timer (F309).

When the edge detection circuit 110 in the remote control receiving circuit 100 detects a rising edge again at time N+3T (F413), the D0 flag 145 and the D1 flag 144 in the data determination circuit 140 are both reset to "0" (F425). At that time, as the data waiting flag 141 in the data determination circuit 140 has already been reset to "0" (F420), the D0 flag 145 and the D1 flag 144 in the data determination circuit 140 are not set to "1" even when the output value of the LHC 122 in the counter circuit 120 becomes 0 or 2T, and only counting-up of the counter circuit 120 is performed (F414).

Then, when the button of the remote control is continuously depressed, the repeat-header part comes at time 192T.

At time T192, the edge detection circuit 110 detects a falling edge (F402), and the LLC 121 and the LHC 122 in the counter circuit 120 are reset (F403).

At time T198T, the output value of the LLC 121 that is counting a Low section in the repeat header part exceeds the value of the THL register 131 in the header detection circuit 130.

Further, at time 208T, a rising edge is detected (F413), then the LLC 121 in the counter circuit 120 counts to 16T and stops counting, and the LHC 122 starts counting (F425).

At time 211T, the output value of the LHC 122 exceeds the set value in the THH register 132 of the header detection circuit 130. Since the output value of the LLC 121 in the counter circuit 120 stops at 16T then, the output value is larger than the set value in the THL register (F415). Therefore, the header detection circuit 130 outputs the header detection signal S130 having a value of "1" to the data determination circuit 140 and the header interrupt generation circuit 160.

The data determination circuit 140 detects this rising edge of the header detection signal S130, then resets the data counter 143 in the data determination circuit 140, further sets the data waiting flag to "1", and resets the D0 flag 145 and the D1 flag 144 to "0" (F416). Since the value of the data counter 143 in the data determination circuit 140 and the set value in the DL register 142 are different from each other at a time when the data counter 143 has been reset, the data receiving completion signal S140 having a value of "0" is outputted.

On the other hand, when the header interrupt generation circuit 160 detects the rising edge of the header detection signal S130, the header interrupt generation circuit 160 outputs a pulse of one cycle once as the header interrupt signal S160. As the value of the mode register 180 is "0" at that time (F417), the header interrupt generation circuit 160 is connected with the CPU 190 through the switch 111. Accordingly, the interrupt signal S111 that is the header interrupt signal S160 is outputted to the interrupt port 191 of the CPU 190, whereby header interrupt occurs (F418, F311).

When the header interrupt occurs on the CPU 190 side, it is judged that the previously depressed same button is continuously depressed, and processing corresponding to the continuously depressed button is carried out (F312). Then, an arbitrary value M is set again in the timer included in the CPU 190 (F308), thereby starting down-counting (F309).

Thereafter, while the button of the remote control is continuously depressed, the header interrupt continues to be issued in the same manner at the intervals of 192T. Then, when the user releases the button of the remote control, no more repeat headers come and then the remote control receiving circuit 100 stops issuing the header interrupt.

On the CPU 190 side, when the internal timer has gone through with the down-counting and issues an under flow interrupt (F310), it is judged that the button of the remote control is released.

When the release of the remote control button has been judged as described above, the CPU 190 sets the mode register 180 to "1" (F302), and goes again into a state of waiting for a data interrupt from the remote control receiving circuit 100.

As described above, according to the remote control receiving system of the first embodiment, the mode register 180 and the switch 111 are provided in the remote control receiving circuit 100, and an interrupt signal to be outputted to the CPU 190 is selected by the switch 111 according to the value set in the mode register 180. Therefore, the number of the interrupt ports on the CPU 190, which are required to implement the remote control receiving function can be reduced to one, whereby receiving of remote control signals can be implemented by using less resources of the CPU as compared to the conventional method that requires plural interrupt ports.

In addition, according to the remote control receiving system of the first embodiment, the remote control receiving circuit 100 does not include a circuit for issuing a trailer interrupt, but the data interrupt signal is made to have the same meaning as a trailer interrupt signal, whereby the scale of the remote control receiving circuit 100 can be reduced. Beside, since no trailer interrupt is issued to the CPU 190, a code corresponding to the trailer interrupt in the CPU 190 and processing loads caused by the trailer interrupt can be reduced.

Further, according to the remote control receiving system of the first embodiment, the remote control receiving circuit 100 includes the switch 111 that selects the connection of the header interrupt generation circuit 160 and the CPU 190 or the connection of the data interrupt generation circuit 170 and the CPU 190, and the mode register 180 that switches the switch 111, and then the switch 111 connects the CPU 190 and the data interrupt generation circuit 170 at the start of the operation. Therefore, if a header inputted to the remote control receiving circuit 100 at time 0 is an error header caused by noises and a header interrupt signal S160 is generated in the remote control receiving circuit 100 due to the error header, this header interrupt signal S160 is not outputted to the CPU 190, whereby occurrence of header interrupt in the CPU due to the error header can be avoided without providing a code for avoiding the header interrupt signal S160 generated by the error header on the CPU 190 side.

Further, according to the remote control receiving system of the first embodiment, the sequence of the operation for receiving the remote control signal includes the step of checking a header detection each time a rising edge or a falling edge is detected (F415 in FIG. 4), whereby even when the remote control signal is interrupted for some reasons while a data part of the signal is being received, and the header part of the next remote control signal is received before data corresponding to the preset number of bits are stored in the shift register 150, a higher priority is given to the detection of the header part and the operation can shift to a status for waiting a new data part following the header part. Accordingly even when an accident happens and a part of the data in the remote control signal is missed, the receiving process for the remote control signal can be continued without putting loads on the CPU.

Furthermore, according to the remote control receiving system of the first embodiment, the data determination circuit 140 in the remote control receiving circuit 100 includes the data waiting flag 141 that enables data to be written in the shift register 150 only when the flag is rising, and this data waiting flag 141 rises after the detection of a header part by the header detection circuit 130, and falls after data corresponding to the data part in the remote control signal have been stored in the shift register 150 and the data receiving completion signal S140 is outputted. Therefore, the data in the shift register 150 can held after the data interrupt is issued to the CPU 190, and thus even when a waveform that is erroneously detected as data is inputted to the remote control receiving circuit 100, writing of the data into the shift register 150 is prevented, thereby avoiding corruption of data of the remote control signal which have been stored in the shift register 150. Accordingly, in the CPU 190, the real time reading of the shift register 150 after the receipt of the data interrupt is not requested so severely as in the conventional method, whereby the interrupt priority of the interrupt port 191 in the CPU 190 can be set lower. When the priority of the interrupt port can be set lower, the processing of the system that is to be controlled by the CPU is not interfered, whereby the operation is not delayed.

Figure 22:
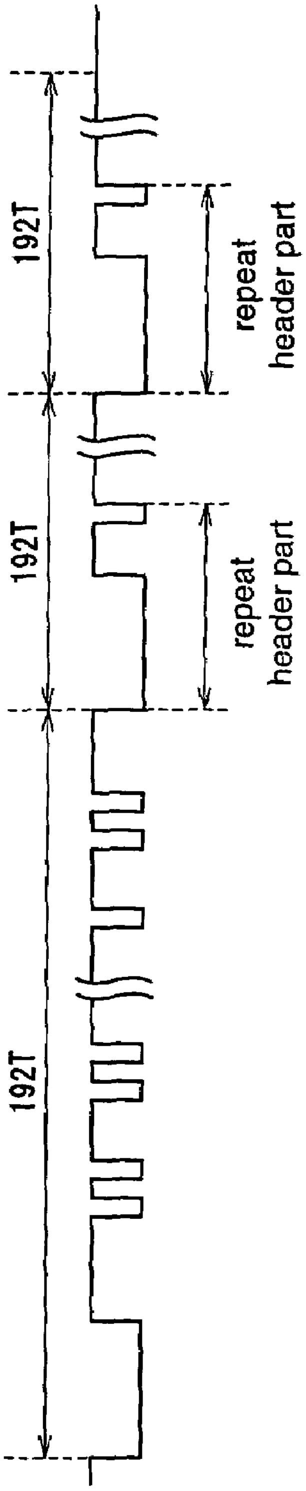
FIG. 22 are diagram showing examples of a waveform of a remote control signal, FIG. 22(*a*) showing a remote control signal that is outputted from a repeat-header type transmitter and FIG. 21(*b*) showing a remote control signal that is outputted from a repeated-data type transmitter.
Figure 22:
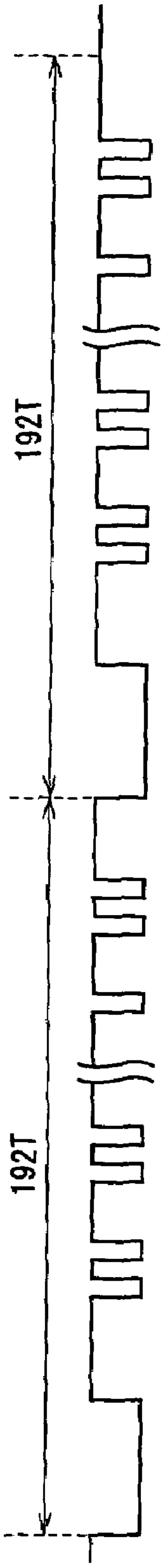
Figure 23:
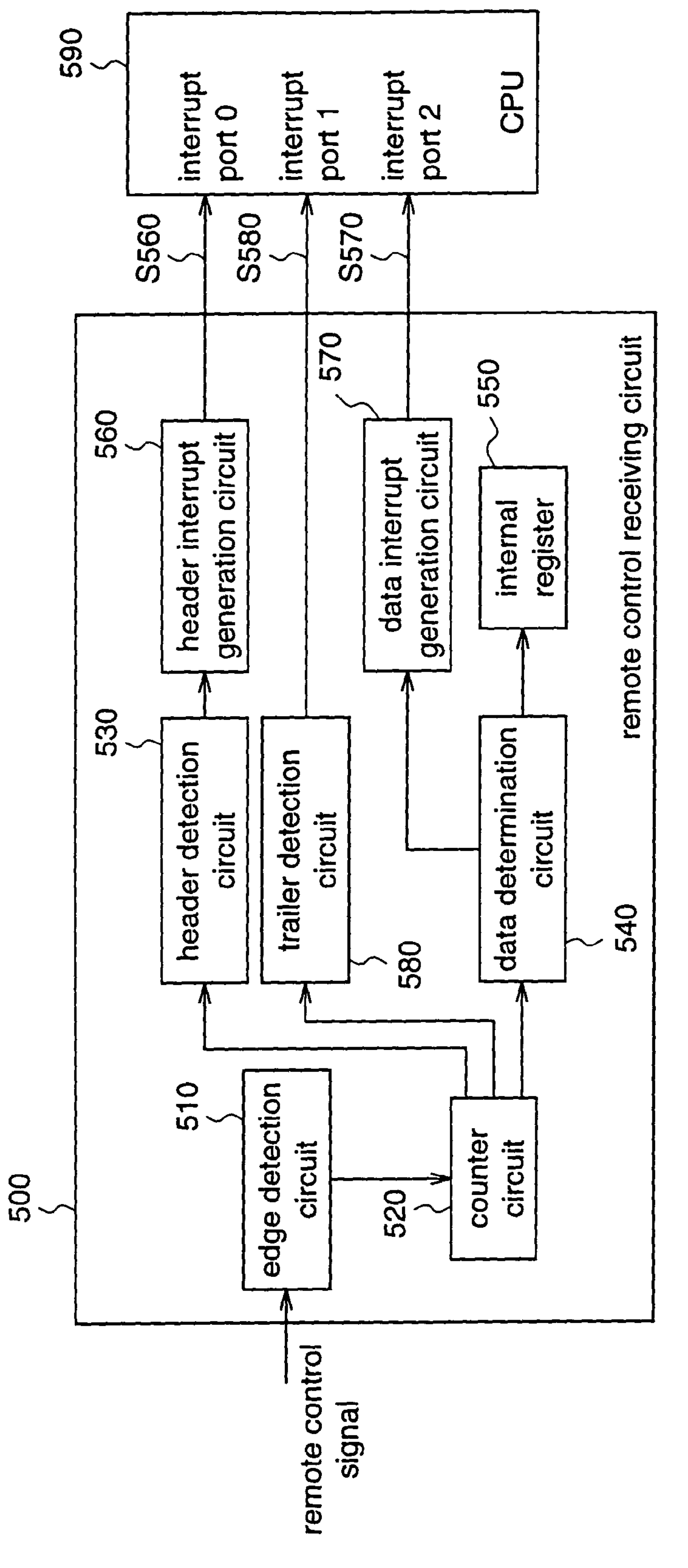
Fig.23 Prior Art
FIG. 23 is a diagram illustrating a construction of a conventional remote control receiving system.
Figure 24:
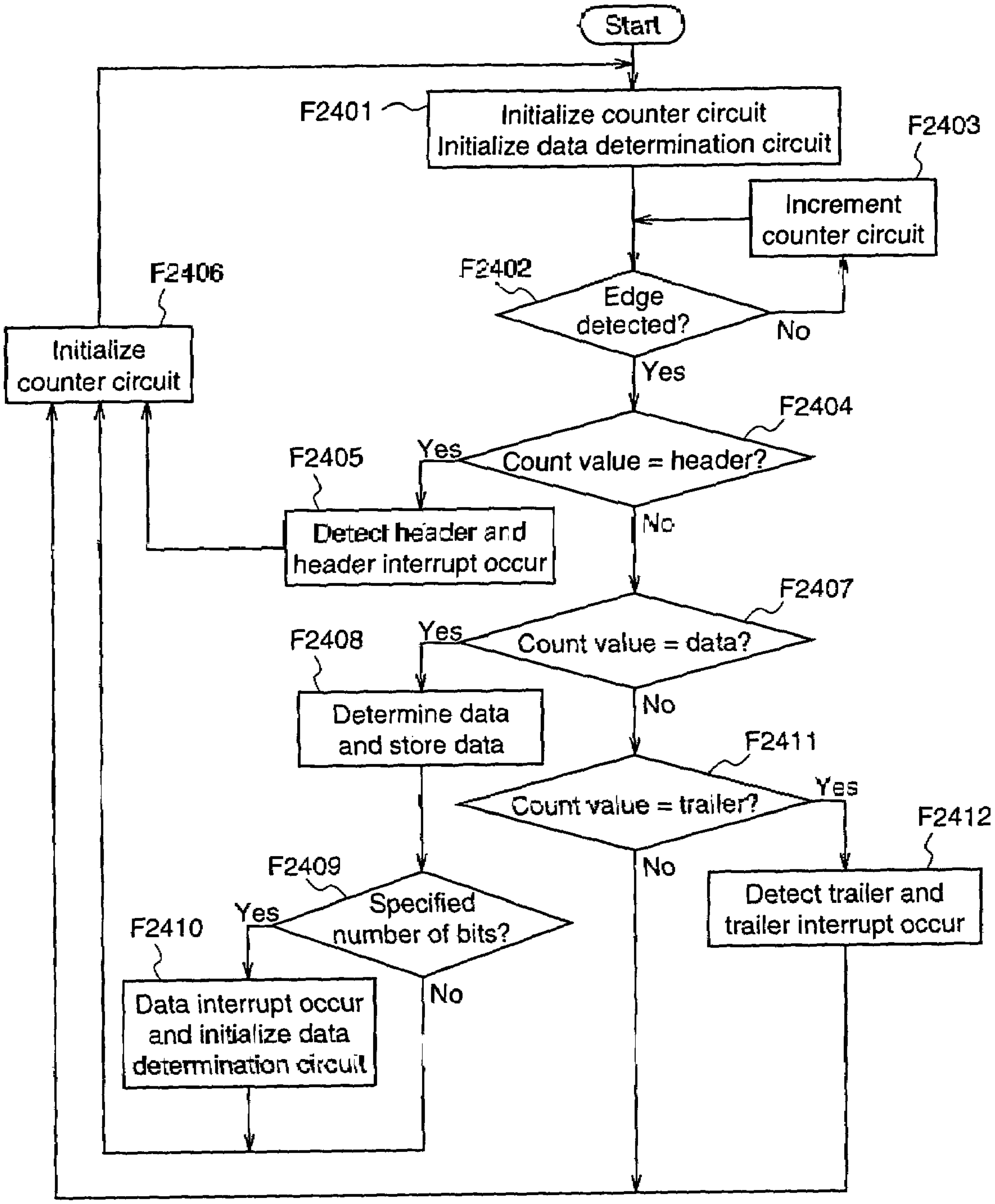
Fig.24 Prior Art
FIG. 24 is a flowchart showing a conventional remote control receiving system.

In the above descriptions, the remote control receiving circuit 100 receives a remote control signal as shown in FIG. 22(*a*), which has a header part including no data when the button is continuously depressed. However, the remote control receiving circuit 100 may receive a remote control signal as shown in FIG. 22(*b*), in which the same waveform repeatedly follows when the button is continuously depressed.

Figure 5:
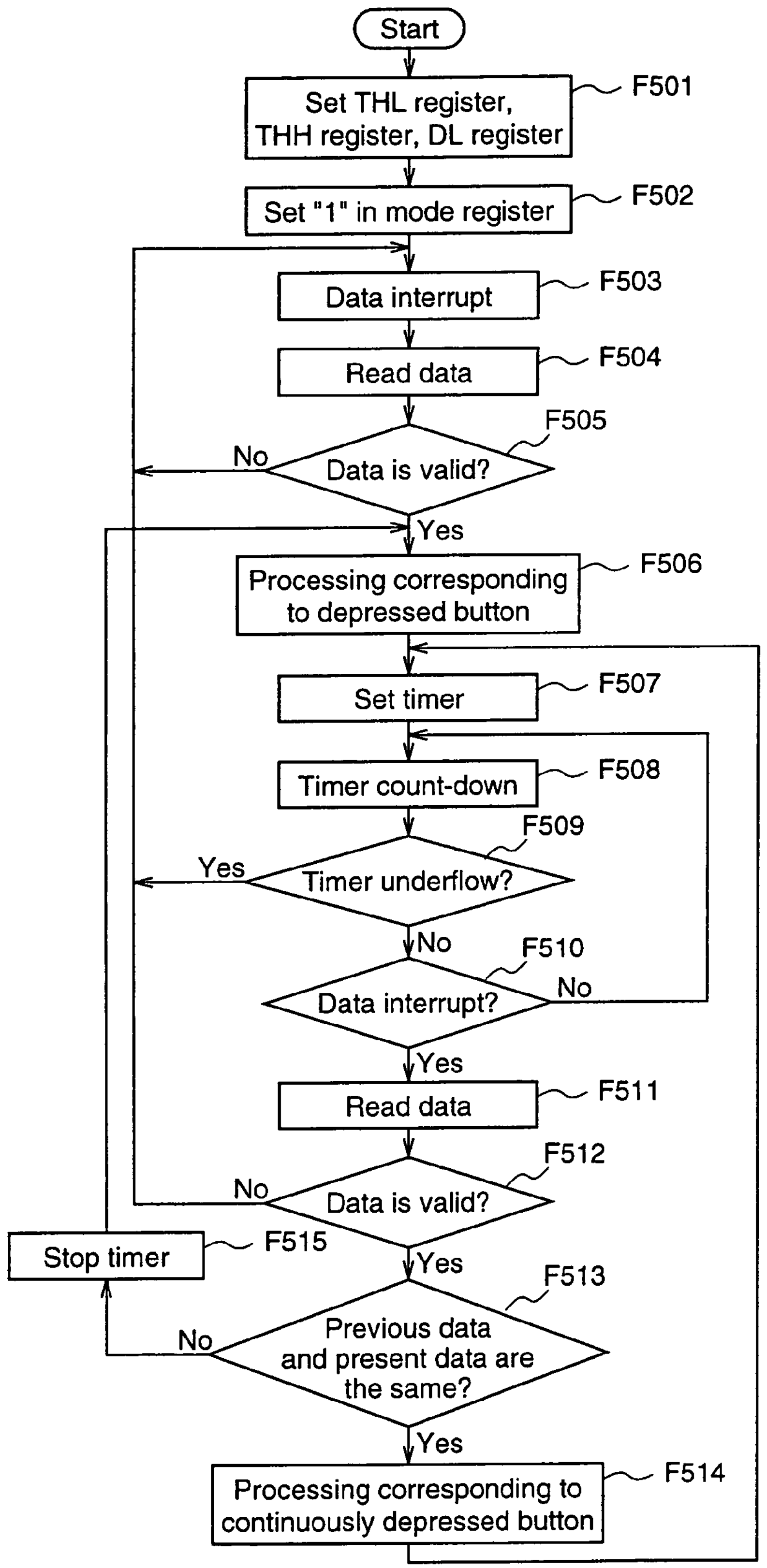
FIG. 5 is a flowchart showing processing on the CPU side according to the first embodiment in a case where a remote control signal that is outputted from a repeated-data type transmitter is received.

Hereinafter, the flow of processing in a case where the remote control receiving circuit 100 having the above-mentioned construction receives a remote control signal that is outputted from a repeated-data type transmitter with reference to FIGS. 4 and 5. FIG. 5 is a flowchart showing processing on the CPU side according to the first embodiment in a case where a remote control signal that is outputted from a repeated-data type transmitter is received.

Operations up to at time N+2T are the same as those in the above-mentioned sequence.

At time N+2T, the CPU 190 receives the interrupt signal S111 that is the data interrupt signal S170 as described above (F503), reads the value of the shirt register 150 (F504), then evaluates the validity of the data read from the shift register 150 to determine the validity of the data (F505), and thereafter carries out processing corresponding to the depressed button (F506). When a repeat-header part is received thereafter as in the above-mentioned example, the value of the mode register 180 is set to "0", while in this case the value of the mode register 180 is not set but is held at "1". That is, the CPU 190 does not go into a header interrupt waiting state but continues to be in the data interrupt waiting state.

Thereafter, the CPU 190 sets an arbitrary value M in the internal timer (F507), and starts down-counting of the timer (F508).

When the button of the remote control is continuously depressed, the header part of repeated data comes at time 192T. Thereafter, the same operations at the times from 0 to N+2T are carried out, and then a data interrupt is issued again from the remote control receiving circuit 100 to the CPU 190 (F510).

When receiving the data interrupt, the CPU 190 reads the value of the shift register 150 (F511), and determine the validity of the data (F512). When the data is determined to be invalid, the CPU 190 shifts the operation to F503, and then gets in a state of waiting for the next data interrupt. On the other hand, when the data is determined to be valid, the CPU 190 compares the data that has been obtained at the previous data interrupt and data that is obtained at this data interrupt to check whether these data are the same or not (F513). When these data are the same, the CPU 190 judges that the remote control button is being continuously depressed, and carries out processing corresponding to the continuously depressed button (F514). When these data are not the same, the CPU 190 judges that another button is newly depressed, then stops the internal timer in the CPU 190 (F515), and carries out processing corresponding to the newly depressed button (F506).

When the remote control button is released, no more data interrupt enters the CPU 190.

In the CPU 190, when the internal timer has performed the down-counting and issues an underflow interrupt (F509), it is judged that the remote control button is released, and then the operation proceeds to F503, so that the CPU 190 gets in a state of waiting for another button depression.

As described above, the remote control receiving system according to the first embodiment can apply also for the transmitter that transmits repeated data.

EMBODIMENT 2

A remote control receiving system according to a second embodiment of the present invention will be described with reference to FIGS. 6 to 12.

In the first embodiment, the data part of the remote control signal that is transmitted from a transmitter is composed of a header part and a data part. In this second embodiment, however, the data part of the remote control signal is composed of a main data part and an inverted data part that is obtained by inverting 0 and 1 of the main data part. In addition, a remote control receiving circuit according to the second embodiment further includes a validity determination circuit that determines the validity of the data part in the remote control signal on the basis of a result of comparison between the main data part and the inverted data part, and an OFF detection circuit that detects release of the remote control button by the user, thereby implementing a remote control receiving function with less resources of the CPU and a smaller processing power of the CPU as compared to the first embodiment.

Figure 6:
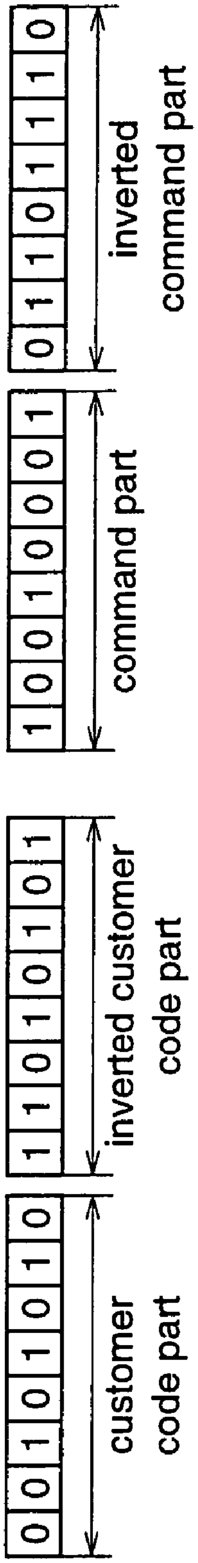
FIG. 6 is a diagram illustrating an example of a data part in a remote control signal including parity resulting from inverted data.

In this second embodiment, the data part of the remote control signal is composed of 32 bits as in the first embodiment, and the 32-bit data part is constituted by a customer code part of 8 bits, an inverted customer code part of 8 bits which are obtained by inverting 0 and 1 of the customer code part, a command part of 8 bits, and an inverted command part of 8 bits which are obtained by inverting 0 and 1 of the command code, as shown in FIG. 6.

Figure 7:
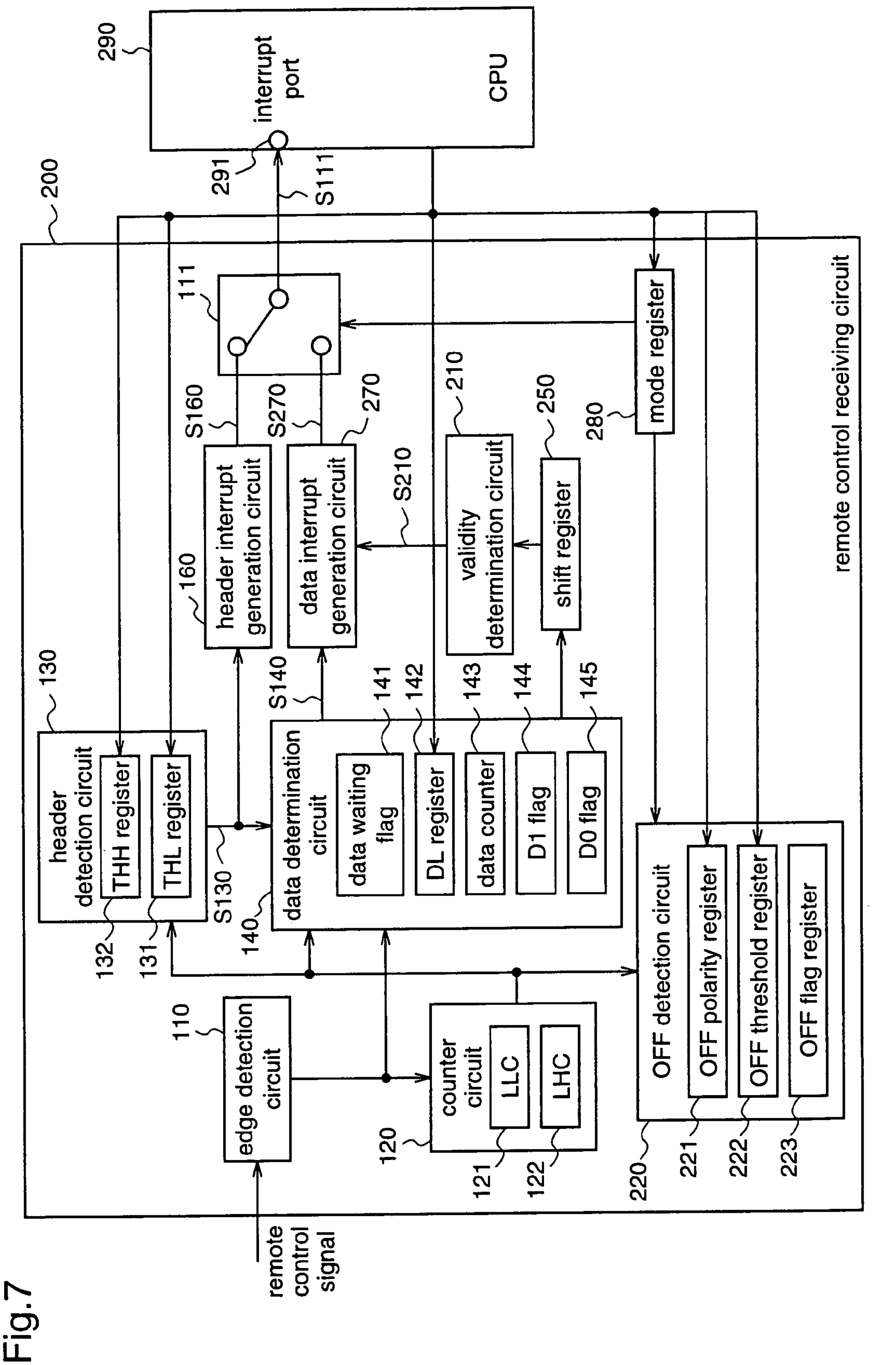
FIG. 7 is a diagram illustrating a construction of a remote control receiving system according to a second embodiment of the present invention.
Figure 8:
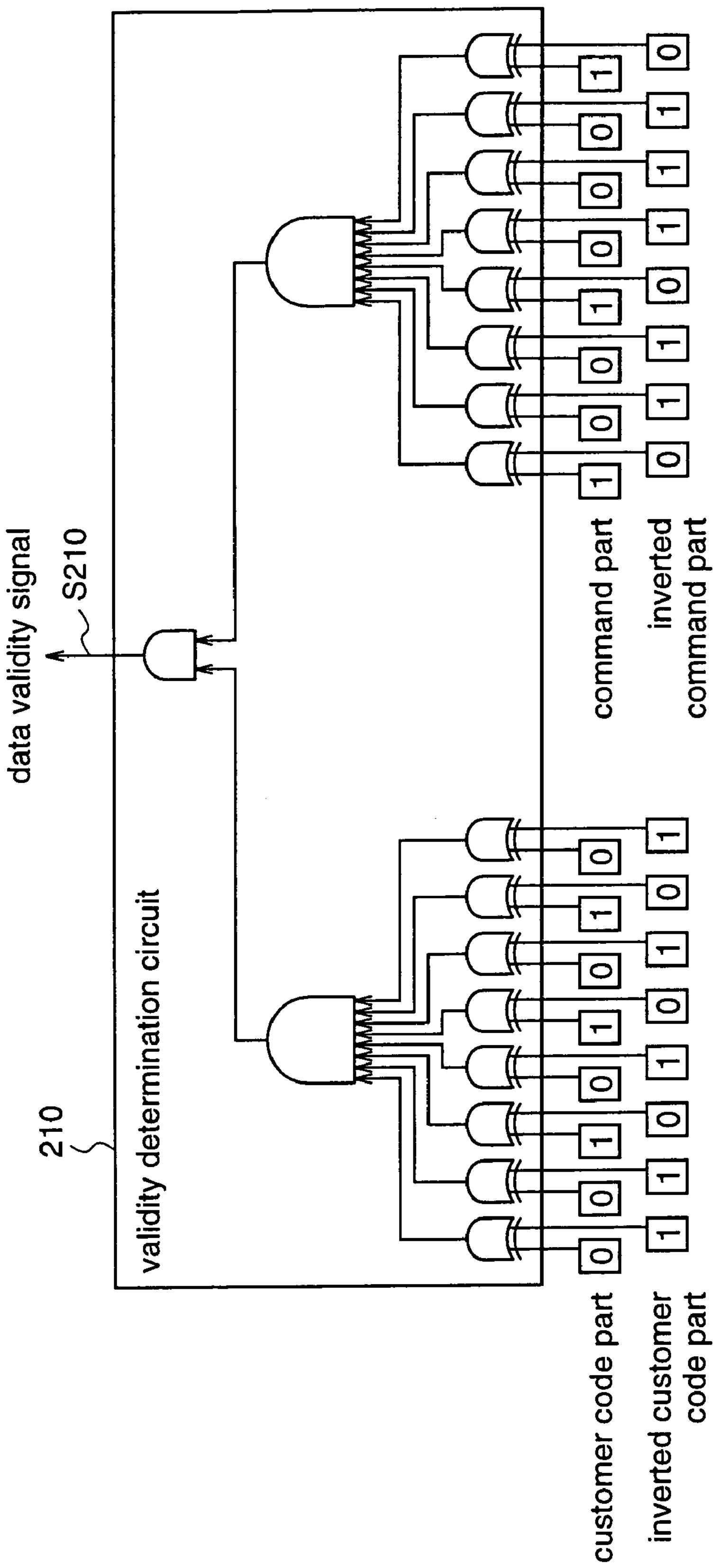
FIG. 8 is a diagram illustrating a specific construction of a validity determination circuit in a remote control receiving circuit according to the second embodiment.

Initially, a construction of the remote control receiving system according to the second embodiment will be described with reference to FIGS. 7 and 8. FIG. 7 is a diagram illustrating a construction of the remote control receiving system according to the second embodiment. FIG. 8 is a diagram illustrating a detailed construction of a validity determination circuit in the remote control receiving circuit according to the second embodiment.

In FIG. 7, the remote control receiving system according to the second embodiment is constituted by a remote control receiving circuit 200 that receives a remote control signal that is transmitted from a transmitter (not shown), and a CPU 290 that set arbitrary values in the various registers in the remote control receiving circuit 200 to control the remote control receiving circuit 200. The remote control receiving circuit 200 includes an edge detection circuit 110, a counter circuit 120, a header detection circuit 130, a data determination circuit 140, a shift register 250, a header interrupt generation circuit 160, a data interrupt generation circuit 270, a mode register 280, a switch 111, a validity determination circuit 210, and an OFF detection circuit 220. The CPU 290 has an interrupt port 291 for receiving an interrupt signal S111 from the remote control receiving circuit 200.

Hereinafter, the construction of the remote control receiving circuit 200 will be described in more detail. There mote control receiving circuit 200 according to the second embodiment can be obtained by adding the validity determination circuit 210 and the OFF detection circuit 220 to the remote control receiving circuit 100 of the first embodiment.

The validity determination circuit 210 is connected with the shift register 250 and the data interrupt generation circuit 270. The validity determination circuit 210 receives data of a remote control signal which is stored in the shift register 250, and outputs a data validity signal S210 indicating whether the data is valid or not. This validity determination circuit 210 can be realized, for example, with a construction as shown in FIG. 8. The data validity signal S210 is obtained as follows. The exclusive OR of corresponding bits of the customer code part (8 bits) and the inverted customer code part (8 bits) of data stored in the shift register 250 is obtained, respectively, and the obtained outputs (8 bits) are ANDed. In addition, the exclusive OR of corresponding bits of the command part (8 bits) and the inverted command part (8 bits) of the data stored in the shift register 250 is obtained, respectively, and the obtained outputs (8 bits) are ANDed. Then, these obtained two ANDs are ANDed to obtain the data validity signal S210.

The OFF detection circuit 220 detects whether the remote control button of the transmitter (not shown) as the transmission source of the remote control signal is released or not. This OFF detection circuit 220 includes an OFF polarity register 221, an OFF threshold register 222 and an OFF flag register 223, and is connected with the counter circuit 120 and the mode register 280. The OFF polarity register 221 and the OFF threshold register 222 are registers whose values can be set by the CPU 290. The OFF flag register 223 is a register for which the CPU 290 can perform only reading. A threshold value that is to be used for detecting release of the remote control button is set in the OFF threshold register 222. When the set value in the OFF polarity register 221 is “0”, the OFF detection circuit 220 compares the output value of the LLC 121 in the counter circuit 120 and the set value in the OFF threshold value register 222, and when the set value of the OFF polarity register 221 is “1”, the OFF detection circuit 220 compares the output value of the LHC 122 in the counter circuit 120 and the set value in the OFF threshold register 222. In the respective comparisons, when the both values are equal, the OFF flag register 223 is set to “1”, while when the outputs value of the LLC 121 and the LHC 122 in the counter circuit 120 are smaller than the set value in the OFF threshold register 222 in a situation that the set value in the mode register 280 is “1”, the OFF flag register 223 is reset to “0”. That is, when the value of the OFF flag register 223 is “1”, it indicates that the remote control button is released, while when the value of the OFF flag register is “0”, it indicates that the remote control button is not released but is in a state where the button is continuously depressed.

The data interrupt generation circuit 270 is connected with the data determination circuit 140 and the validity determination circuit 210. When detecting a rising of the data receiving completion signal S140 from the data determination circuit 140 in a situation where the data validity signal S210 from the validity determination circuit 210 has a value of “1”, the data interrupt generation circuit 270 outputs a pulse of one cycle once as a data interrupt signal S270.

The mode register 280 is connected with the switch 111 and the OFF detection circuit 220. As in the first embodiment, the mode register 280 is a register whose value can be set by the CPU 290. When “0” is set in the mode register 280, the switch 111 connects the header interrupt generation circuit 160 and the CPU 290, while when “1” is set in the mode register 280, the switch 111 connects the data interrupt generation circuit 160 and the CPU 190.

The CPU 290 has a task T110 (which will be described later) as a round robin task. Other components are the same as those in the first embodiment.

Figure 9:
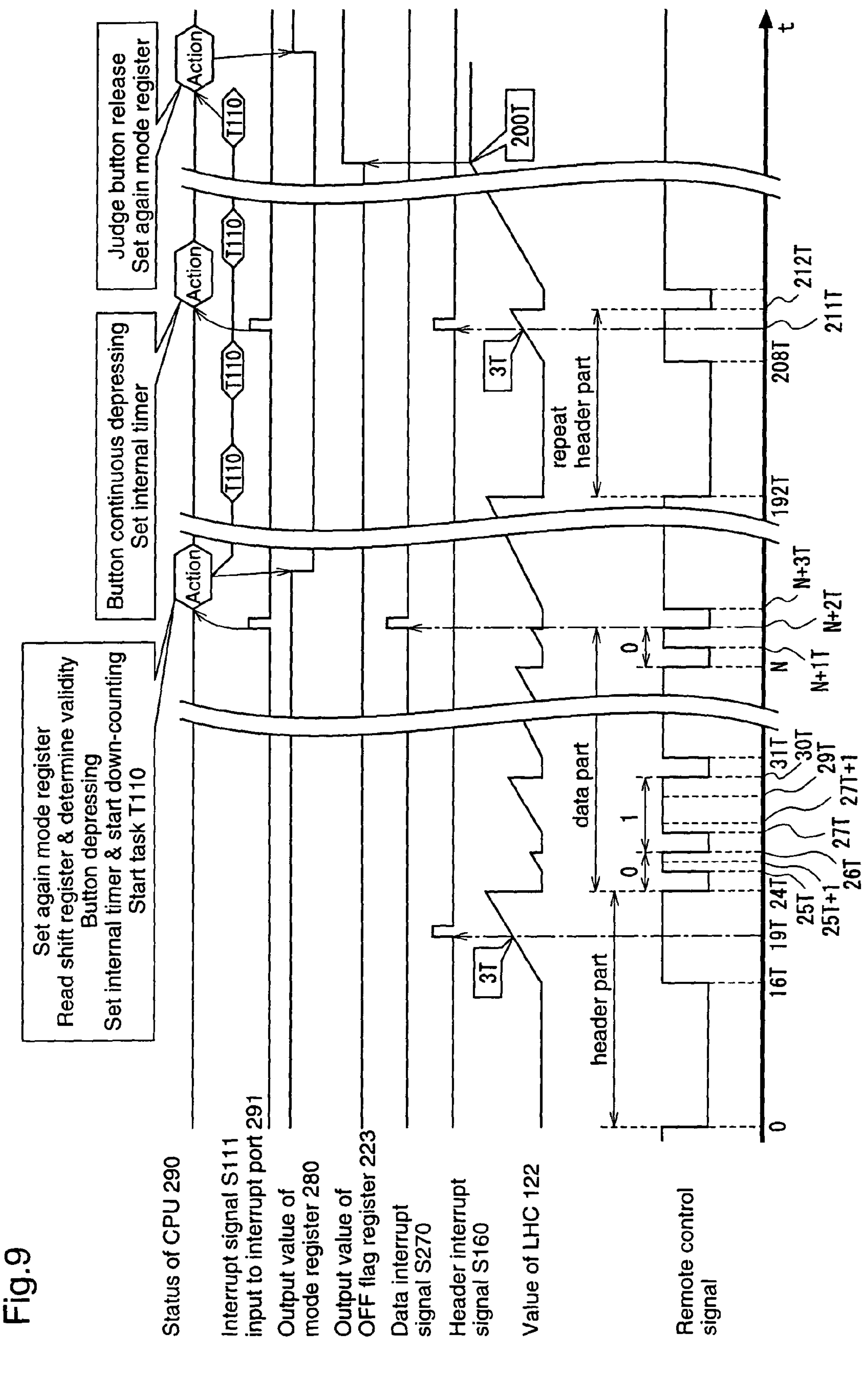
FIG. 9 is a timing chart for a remote control receiving circuit and a CPU when a remote control signal that is outputted from a repeat-header type transmitter is received by the remote control receiving system according to the second embodiment.
Figure 10:
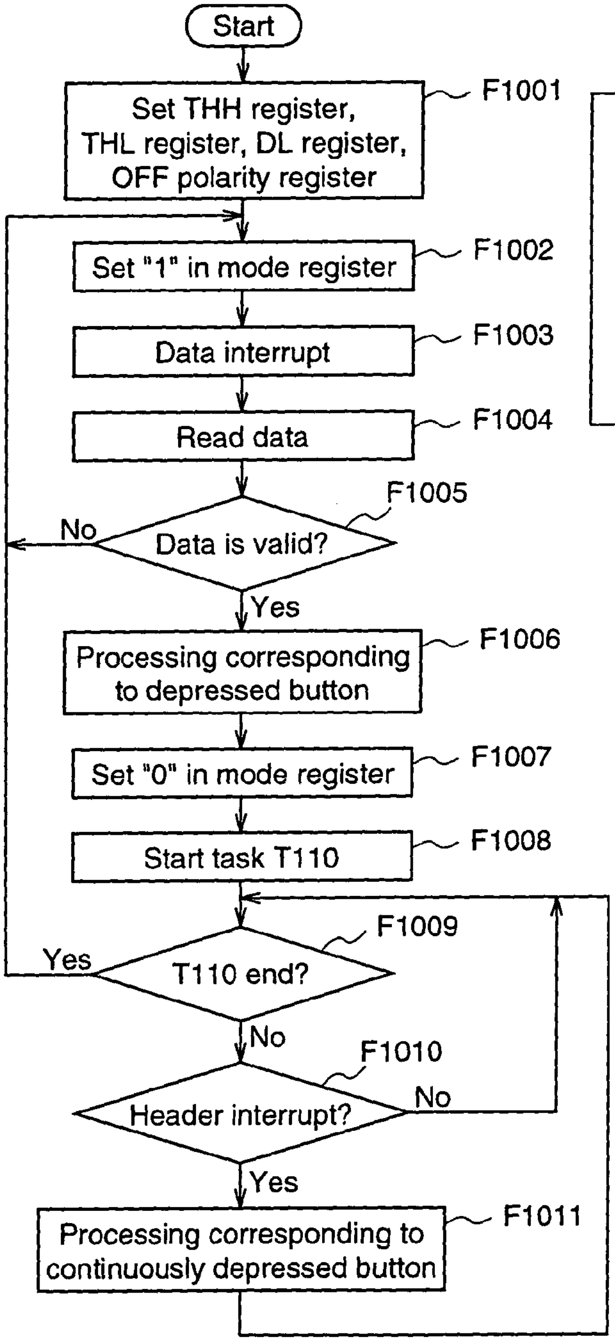
FIG. 10 are diagrams showing sequences of operations on the CPU side in a case where a remote control signal that is outputted from a repeat-header type transmitter is received according to the second embodiment, FIG. 10(*a*) being a flowchart showing processing on the CPU side and FIG. 10(*b*) being a flowchart showing processing of task T110 in the CPU.
Figure 10:
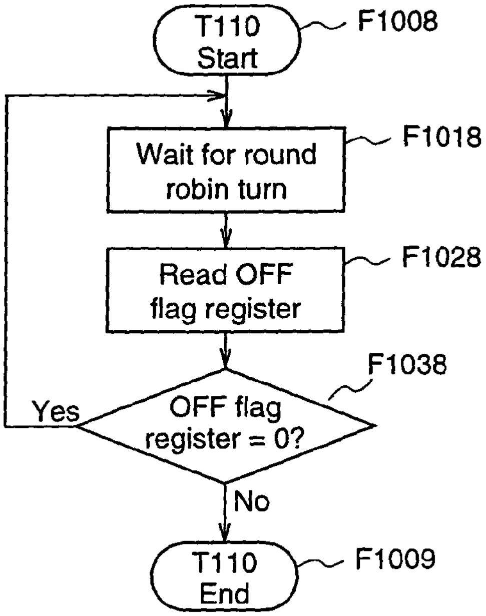
Figure 11:
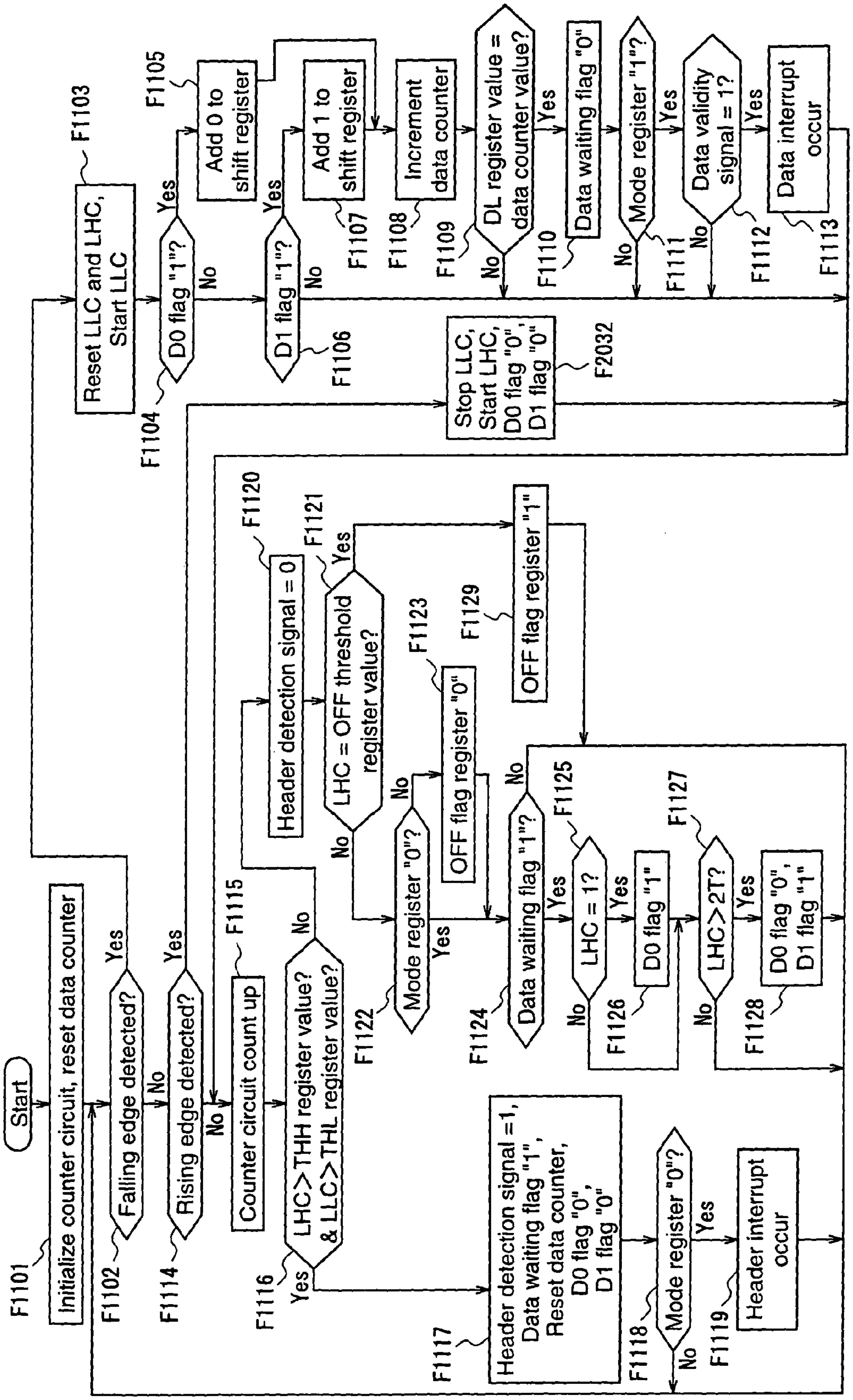
FIG. 11 is a flowchart showing processing in the remote control receiving circuit according to the second embodiment in a case where a remote control signal that is outputted from a repeat-header type transmitter is received.

Next, the flow of processing in the remote control receiving system having the above-mentioned construction in a case where a remote control signal that is outputted from a repeat-header type transmitter is received will be described with reference to FIGS. 9 to 11. FIG. 9 is a timing chart for the remote control receiving circuit and the CPU in a case where the remote control receiving system according to the second embodiment receives a remote control signal that is outputted from a repeat-header type transmitter. FIG. 10(*a*) is a flowchart showing processing on the CPU side according to the second embodiment in a case where a remote control signal that is outputted from a repeat-header type transmitter is received, and FIG. 10(*b*) is a flowchart showing processing of task T110 in the CPU according to the second embodiment. FIG. 11 is a flowchart showing processing in the remote control receiving circuit according to the second embodiment in a case where a remote control signal that is outputted from the repeat-header type transmitter is received.

Initially, as initial setting at the start of the operation, the CPU 290 sets values in the THL register 131 and the THH register 132 in the header detection circuit 130, the DL register 143 in the data determination circuit 140, and the mode register 280 like in the first embodiment, as well as sets values in the OFF polarity register 221 and the OFF threshold register 222 (F1001 and F1002). Hereinafter, the values which are set in the respective registers are specifically described. “1” is set in the OFF polarity register 221, and 200T is set in the OFF threshold register 222 in the OFF detection circuit 220. Here, the same values that are employed in the first embodiment are set in the other registers. That is, 6T is set in the THL register 131 in the header detection circuit 130, 3T is set in the THH register 132, 32 is set in the DLL register 143 in the data determination circuit 140, and “1” is set in the mode register 280.

After the values are set in the respective registers as described above, the CPU 290 waits for issuance of a data interrupt signal S270 from the remote control receiving circuit 200.

On the remote control receiving circuit 200 side, the counter circuit 120 and the data counter 143 in the data determination circuit 140 are initialized at the start of the operation (F1101).

Then, when the button of the remote control is depressed, first a header part of the remote control signal enters the remote control receiving circuit 200. Assuming that the edge detection circuit 110 detects the first falling edge in the header part at time 0 (F1102), the LLC 121 and the LHC 122 in the counter circuit 120 are reset at time 0 (F1103). Since the D0 flag 145 and the D1 flag 144 in the data determination circuit 140 are both “0” at that time (F1104 and F1106), no data are stored in the shift register 250, and only counting-up of the counter circuit 120 is performed (F115).

At time 6T, the output value of the LLC 121 that counts a Low section in the header part of the remote control signal exceeds the value of the THL register 131.

At time 16T, a rising edge is detected (F1114), then the LLC 121 in the counter circuit 120 counts to 16T and stops the counting, and the LHC 122 starts counting (F1130).

At time 19, the output value of the LHC 122 exceeds the set value in the THH register 132 in the header detection circuit 130. Since the output value of the LLC 121 in the counter circuit 120 stops at 16T, the output value of the LLC 121 is larger than the set value of the THL register 131 at that time (F1116). Therefore, the header detection circuit 130 outputs the header detection signal S130 having the value of “1” to the data determination circuit 140 and the header interrupt generation circuit 160.

When detecting this rising edge of the header detection signal S130, the data determination circuit 140 resets the data counter 143 in the data determination circuit 140, sets the data waiting flag to “1”, and further resets the D0 flag 145 and the D1 flag 144 to “0” (F1117). Further, the header interrupt generation circuit 160 that has detected the rising edge of the header detection signal S130 outputs a pulse of one cycle once as the header interrupt signal S160. However, as the value of the mode register 280 is “1” at that time, the header interrupt generation circuit 160 is not connected to the interrupt port 291 of the CPU 2190, whereby the header interrupt signal S160 is not notified to the CPU 290 (F1118).

Then, at time 24T, the edge detection circuit 110 detects a falling edge (F1102), then the LLC 121 and the LHC 122 in the counter circuit 120 are both reset (F1103), and consequently the values of the LLC 121 and the LHC 122 fall below the values of the THL register 131 and the THH register 132 in the header detection circuit 130 (F1116), whereby the header detection signal S130 having a value of “0” is outputted (F1120). Since the OFF polarity register 221 in the OFF detection circuit 220 has been set to “1”, the value of the LHC 122 in the counter circuit 120 and the set value of the OFF threshold register 222 are compared in the OFF detection circuit 220 thereafter. Since the value of the LHC 122 in the counter circuit 120 is “3T” and the mode register 280 has been set to “0” at that time (F1121 and F1122), the OFF flag register is not reset to “0”. Further, the data waiting flag 141 in the data determination circuit 140 has been set to “1” at that time (F1124), and accordingly the D1 flag 144 and the D0 flag 145 in the data determination circuit 140 are enabled to be set.

Then, at time 25T, the edge detection circuit 110 detects a rising edge (F1114), and the LLC 121 in the counter circuit 120 counts to 1T and stops counting (F1113).

At time 25T+1, the output value of the LHC 122 in the counter circuit 120 becomes equal to “1”. Since the data waiting flag 141 in the data determination circuit 140 is “1” and the LHC 122 in the counter circuit 120 reaches “1” at that time (F1125), the D0 flag 145 in the data determination circuit 140 is set to "1" (F1126).

Then, when the edge detection circuit 110 detects a falling at time 26T (F1102), the data determination circuit 140 is notified of the falling edge by the edge detection circuit 110 in a situation where the D0 flag 145 is "1" (F1102), so that the LLC 121 and the LHC 122 in the counter circuit 120 are reset (F1103) as well as the shift register 250 is shifted by one bit, to add "0" in the shift register 250 (F1105). At that time, the data counter 143 is incremented to "1" (F1108). As the value of the data counter 143 has not yet reached the specified number of bits (F1109), the counter circuit 120 counts up (F1115).

At time 27T, the edge detection circuit 110 detects a rising edge (F1114), and the D0 flag 145 and the D1 flag 144 in the data determination circuit 140 are both reset to "0" (F1130).

Then, at time 27T+1, the D0 flag 145 is set to "1" like in the above-mentioned operation at time 25T+1 (F1126).

At time 29T, the LHC 112 in the counter circuit 120 counts to 2T, and as the data waiting flag 141 is "1", and the LHC 122 in the counter circuit 120 reaches "2T" (F1124, F1125, and F1127), the D0 flag 145 is set to "0", and the D1 flag 144 is set to "0" (F1128).

At time 30T, the edge detection circuit 110 detects a falling edge (F1102). At that time, the LLC 121 and the LHC 122 in the counter circuit 120 are reset (F1103). As the data determination circuit 140 is notified of the detection of the falling edge by the edge detection circuit 110 in a situation where the D1 flag 144 is "1" (F1104), the shift register 250 is shifted by one bit to add "1" in the shift register 250 (F1107). Then, the data counter 143 is incremented to "2" (F1108). Since the value of the data counter 143 does not yet reach the specified number of bits (F1109), the counter circuit 120 counts up thereafter (F1115).

When the edge detection circuit 110 detects a rising edge at time 31T (F1114), the D0 flag 145 and the D1 flag 144 in the data determination circuit 140 are both reset to "0" (F1130). Hereinafter, data of the data part in the remote control signal are stored in the shift register 250 by one bit, in the same manner.

Then, the above-mentioned operations are repeated. Assuming that the output value of the data counter 143 in the data determination circuit 140 is incremented to "31" at time N, the edge detection circuit 110 detects a rising edge at time N+1T, and detects a falling edge at time N+2T (F1102). Then, "0" is added to the shift register 250 (F1105), and the output value of the data counter 143 in the data determination circuit 140 is incremented to "32" (F1108), so that the value of the data counter 143 in the data determination circuit 140 and the set value of the DL register 142 become equal to each other (F1109). At that time, the data waiting flag 141 in the data determination circuit 140 is reset to "0" (F1110), and then the data receiving completion signal S140 is outputted from the data determination circuit 140 while simultaneously the validity of the data stored in the shift register 250 is determined by the data validity determination circuit 210.

For example, when the data in the shift register 250 is corrupted only by one bit due to noises at the receiving, the data validity signal S210 having a value of "0" is outputted from the data validity determination circuit 210 (F1112), and accordingly the data interrupt generation circuit 270 does not output the data interrupt signal S270 even when detecting a rising edge of the data receiving completion signal S140 from the data determination circuit 140. Thus, the receiving of a data interrupt caused by error data can be avoided, whereby the CPU 290 can operate without receiving needless interrupts from the remote control receiving circuit 200 until the user newly depresses the remote control button and the remote control receiving circuit 200 receives another remote control signal including data.

When the validity determination circuit 210 determines that the data stored in the shift register 250 is valid, the validity determination circuit 210 outputs the data validity signal S210 having a value of "1". When the data interrupt generation circuit 270 detects a rising of the data receiving completion signal S140 from the data determination circuit 140 in a situation where the data validity signal S210 having a value of "1" is outputted from the validity determination circuit 210, the data interrupt generation circuit 270 outputs a pulse of one cycle once as a data interrupt signal S270. Since the mode register 280 has been set to "1" at that time (F1111), the data interrupt generation circuit 270 and the CPU 290 are connected through the switch 111. Therefore, an interrupt signal S111 that is the data interrupt signal S270 is outputted to the interrupt port 290 of the CPU 290, and then a data interrupt occurs (F1113).

On the CPU 290 side, when receiving the interrupt signal Sill that is the data interrupt signal S270 from the remote control receiving circuit 200 (F1003), the CPU 290 evaluates the validity of the data read from the shift register 250 (F1005), and returns to F1002 when the data is invalid, while obtaining information of the depressed button to start the processing corresponding to the button when the data read from the shift register 250 is valid (F1006). The evaluation as to the validity of data is performed to check whether this is data corresponding to the remote control button or not. In this evaluation, this data is determined to be invalid when there is no corresponding data, while the data is determined to be valid when there exist corresponding data.

Then, the CPU 290 sets the mode register 280 to "0" (F1007), and starts task T110 shown in FIG. 10(*b*) as a round robin task (F1008).

Thereafter, while the remote control button is being continuously depressed, a repeat header comes at the intervals of 192T, and a header interrupt is continuously issued. When the header interrupt is notified (F1010), the CPU 290 judges that the previously depressed button is continuously depressed, and performs the processing corresponding to the continuously depressed button (F1011).

Meanwhile, as shown in FIG. 10(*b*), each time the execution turn for task T110 in the CPU 290 comes around (F1018), data of the OFF flag register 223 is read (F1028). When the value of the OFF flag register is "0" (F1038), the CPU 290 enters again the round robin queue (F1018).

When the user releases the remote control button, no more repeat header parts come to the CPU 290, and a long High section appears in the remote control signal. 200T after the last repeat header, the output value of the LHC 122 reaches 200T (F1121), and the OFF flag register 223 is set to "1" (F1129).

Then, when "1" is read from the OFF flag register 223 in the task T110 on the CPU 290 side (F1028 and F1038), the task T110 ends on the CPU 290 side (F1009). When the task T110 ends, the CPU 290 detects release of the remote control button, then sets the mode register 280 to "1" (F1010), and again goes into a state of waiting for a data interrupt from the remote control receiving circuit 200.

As described above, according to the remote control receiving system of the second embodiment, the validity determination circuit 210 is provided in the remote control receiving circuit 200, and when a data part of the remote control signal that is received by the remote control receiving circuit 200 is composed of a main data part, and an inverted data part that is obtained by inverting 0 and 1 of the main data part, the validity determination circuit 210 determines the validity of the data part in the remote control signal by comparing the main data part and the inverted data part. Further, when the validity determination circuit 210 determines that the data of the remote control part is valid and the data determination circuit 140 outputs the data receiving completion signal S140, the data interrupt generation circuit 270 outputs the data interrupt signal S270. Therefore, needless data interrupt signals due to error data are not issued to the CPU 290, whereby the processing power of the CPU 290, which is used for the remote control receiving function can be further reduced.

According to the remote control receiving system of the second embodiment, the remote control receiving circuit 200 further includes the OFF detection circuit 220 that detects release of the remote control button, and the CPU 290 has a code for a round robin task T110 which is started after carrying out the processing corresponding to a depressed remote control button, whereby the result of judgement as to whether the remote control button is released or not, which is detected by the OFF detection circuit 220 is read by the CPU 290 in the flow of the task T110. Therefore, on the CPU 290 side, the release of the remote control button by the user can be detected without using an internal timer, thereby further reducing the resources of the CPU 290, which are used for the remote control receiving function.

Further, in the above description, the remote control receiving circuit 200 receives a remote control signal as shown in FIG. 22(*a*) which comprises a repeat-header part including no data, when the button is continuously depressed, while the remote control receiving circuit 200 may receive a remote control signal as shown in FIG. 22(*b*), in which the same waveform repeatedly follows when the button is continuously depressed.

Figure 12:
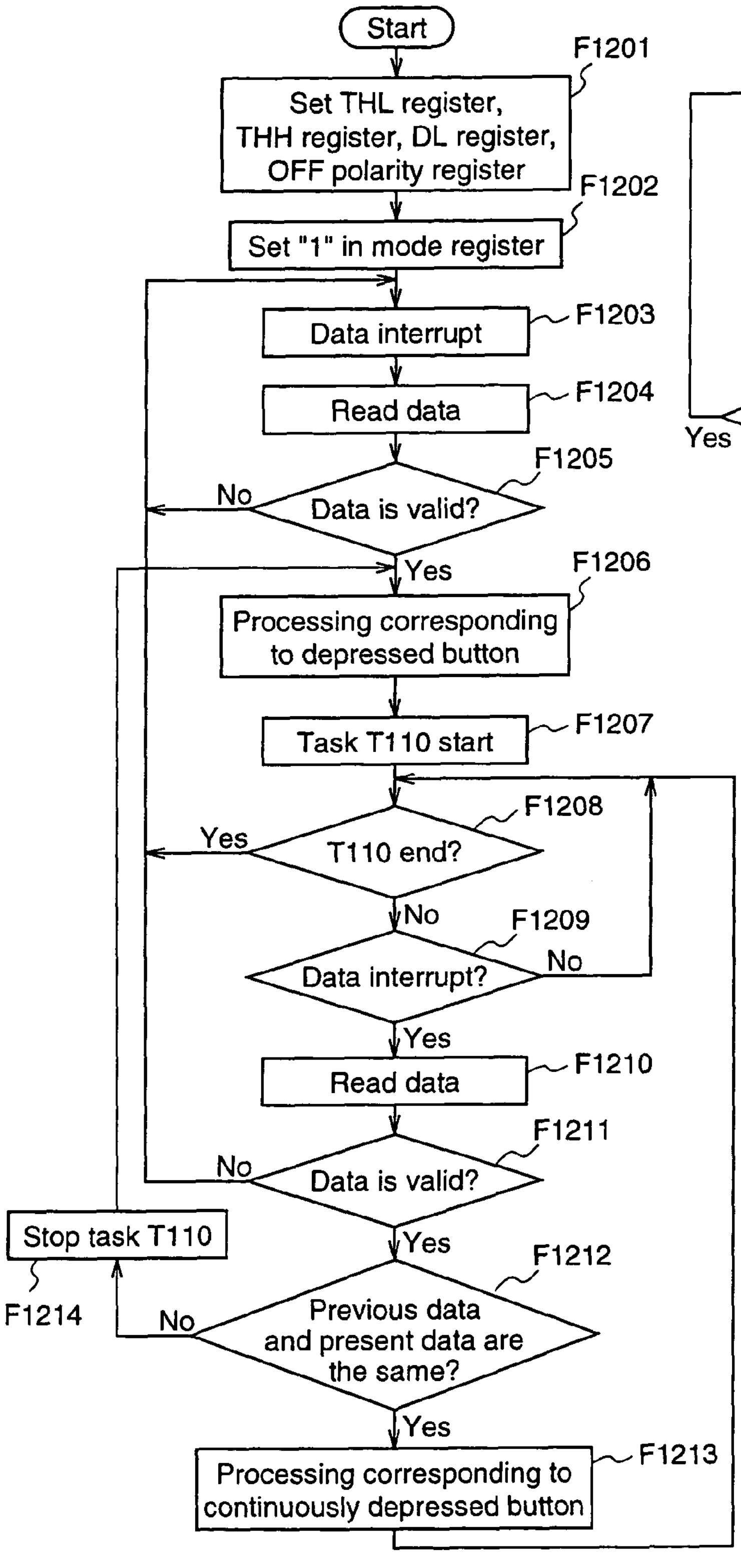
FIG. 12 are diagrams showing a sequence of operations on the CPU side in a case where a remote control signal that is outputted from a repeated-data type transmitter is received according to the second embodiment, FIG. 12(*a*) being a flowchart showing processing on the CPU side and FIG. 12(*b*) being a flowchart showing processing of task T110 in the CPU.
Figure 12:
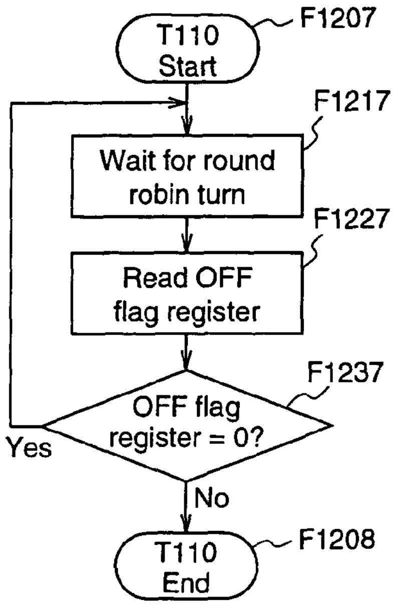

Hereinafter, the flow of processing in a case where a remote control signal that is outputted from a repeated-data type transmitter is received by the remote control receiving circuit 200 having the construction as described above will be described, with reference to FIGS. 11 and 12. FIG. 12(*a*) is a flowchart showing processing on the CPU side according to the second embodiment when a repeated-data type remote control signal is received. FIG. 12(*b*) is a flowchart showing processing of task T110 in the CPU according to the second embodiment.

The operations up to at time N+2T are the same as those in the above-mentioned sequence.

At time N+2T, on the CPU 290 side, data that has been determined to be valid by the validity determination circuit 210 is read (F1204), and processing corresponding to the depressed button is carried out (F1206) as described above. When a repeat-header part is received thereafter as in the above-mentioned case, the value of the mode register 280 is set to "0", but in this case the value of the mode register 280 is not set again but kept at "1", thereby starting the task T110 (F1207).

When the remote control button is continuously depressed, a header part of repeated data comes at time 192T. Thereafter, the same operations as those at times 0 to N+2T are performed, and then a data interrupt is issued again from the remote control receiving circuit 200 to the CPU 290 (F1209).

The CPU 290 that has received the data interrupt reads the value of the shift register 250 (F1209), and determines the validity of the data (F1211). When the data is determined to be invalid, the operation shifts to F1203, and the CPU 290 goes into a state of waiting for the next data interrupt. On the other hand, when the data is determined to be valid, the CPU 290 compares whether the data obtained at the previous data interrupt and data obtained at the present data interrupt are the same or not (F1212). When these data are the same, the CPU 290 judges that the remote control button is continuously being depressed, and performs processing corresponding to the continuously depressed button (F1213). When there data are not the same, the CPU stops the task T110 (F1214), and judges that another button is newly depressed, thereby performing processing corresponding to the newly depressed button (F1206).

As long as the remote control button is continuously depressed, the data interrupt occurs at intervals of 192T, and the same data are read in F1210. Meanwhile, as shown in FIG. 12(*b*), each time the execution turn of the task T110 included in the CPU 290 comes around (F1217), the value of the OFF flag register 223 is read (F1227). When the value of the OFF flag register 223 is "0" (F1237), the CPU 290 enters again the queue of the round robin (F1208).

When the user releases the remote control button, no more repeat header part comes to the CPU 290, and a long High section appears in the remote control signal. Then, 200T after the last repeat header, the output value of the LHC 122 reaches 200T (F1121), and the OFF flag register 223 is set to "1" (F1129).

Then, on the CPU 290 side, when "1" is read from the OFF flag register 223 in the task T110 (F1227 and F1237), the task T110 ends (F1208). When the task T110 ends, the CPU 290 detects the release of the remote control button, and then shifts its operation to F1203, thereby going into a state of waiting for another depression of the button.

As described above, the remote control receiving system according to the second embodiment may apply also for the transmitter that transmits repeated data.

EMBODIMENT 3

A remote control receiving system according to a third embodiment of the present invention will be described with reference to FIGS. 13 to 17.

In the remote control receiving system according to the third embodiment, it is assumed that the data part in the remote control signal is composed of a main data part and an inverted data part that is obtained by inverting 0 and 1 of the main data part, as in the second embodiment. Further, the header interrupt generation circuit and the data interrupt generation circuit are not provided in the remote control receiving circuit according to the third embodiment, and no interrupt is issued from the remote control receiving circuit to the CPU, whereby a remote control receiving function is implemented only with a round robin task included in the CPU, without using any interrupt port of the CPU. In the above-mentioned second embodiment, the release of the remote control button is judged by comparing the value of the register in the counter circuit 120 and the set value in the OFF threshold register 222 in the OFF detection circuit 220, while in this third embodiment an OFF counter that always counts up, up to a certain value is provided in the OFF detection circuit, and then the value of the OFF counter and the value of the OFF threshold register are compared, whereby delay of detection of release of the remote control button due to noises can be avoided.

In this third embodiment, a data part in the remote control signal that is outputted from a transmitter (not shown) is composed of a customer code part of 8 bits, an inverted customer code part of 8 bits which are obtained by inverting 0 and 1 of the customer code, a command part of 8 bits, and an inverted command part of 8 bits which are obtained by inverting 0 and 1 of the command part, as shown in FIG. 6, like in the second embodiment.

Figure 13:
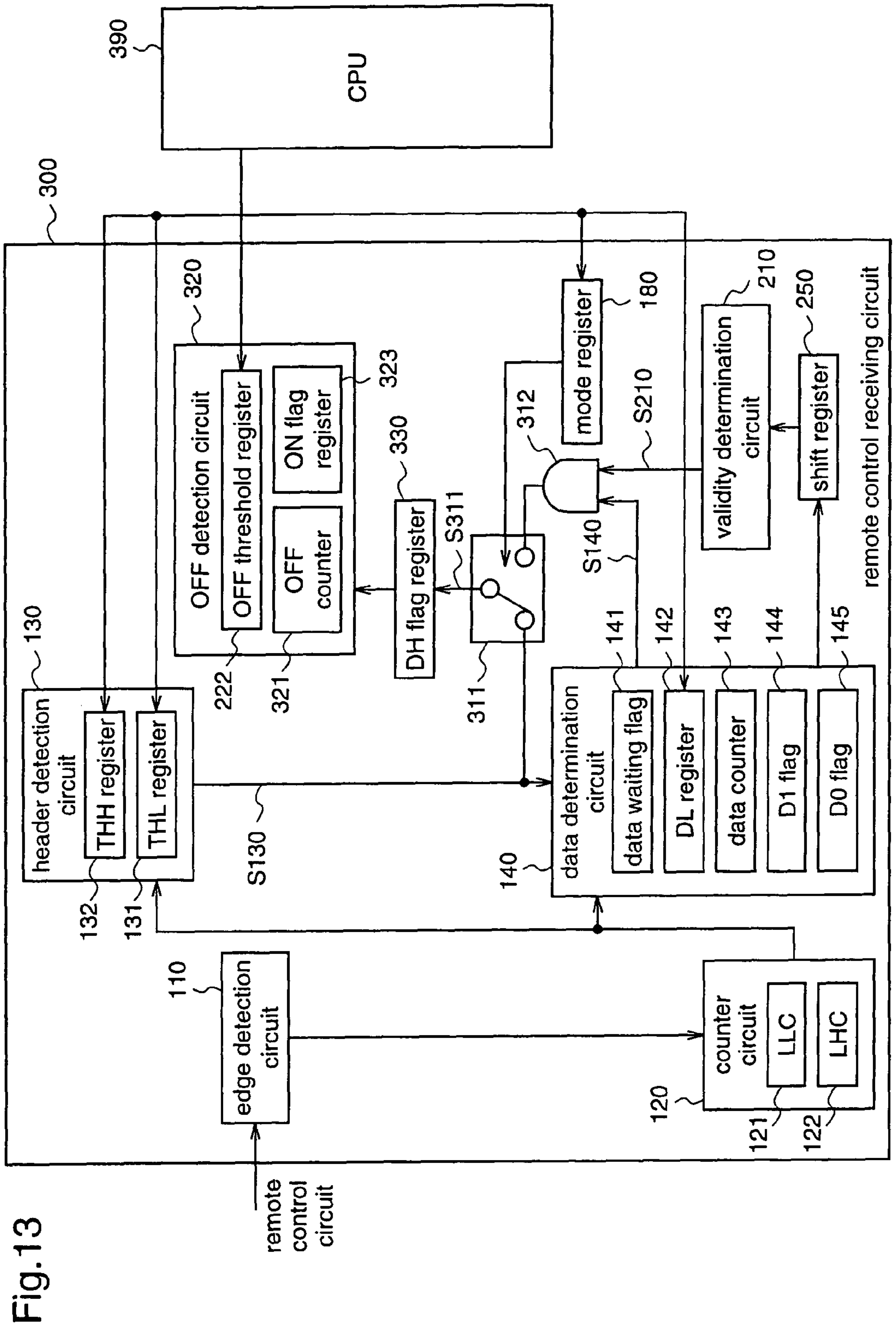
FIG. 13 is a diagram illustrating a construction of a remote control receiving system according to a third embodiment of the present invention.

Initially, a construction of the remote control receiving circuit according to the third embodiment will be described with reference to FIG. 13. FIG. 13 is a diagram illustrating a construction of the remote control receiving system according to the third embodiment.

In FIG. 13, the remote control receiving system according to the third embodiment is constituted by a remote control receiving circuit 300 that receives a remote control signal that is outputted from a transmitter (not show), and a CPU 300 that sets arbitrary values in various registers in the remote control receiving circuit 300 to control the remote control receiving circuit 300. The remote control receiving circuit 300 includes an edge detection circuit 110, a counter circuit 120, a header detection circuit 130, a data determination circuit 140, a shift register 250, a mode register 180, a switch 311, an AND gate 312, an OFF detection circuit 320, and a data/header flag register (hereinafter, referred to as DH flag register) 330. As no interrupt is outputted from the remote control receiving circuit 300, the CPU 390 has no interrupt port.

Hereinafter, the construction of the remote control receiving circuit 300 is described in more detail. The remote control receiving circuit 300 according to the third embodiment is obtained by eliminating the data interrupt generation circuit and the header interrupt generation circuit from the remote control receiving circuit 200 of the second embodiment, and adding the DH flag register 300 thereto.

The DH flag register 330 is connected with the switch 311 and the OFF detection circuit 320, and this is a register to/from which data can be written or read by the CPU 390. The DH flag register 330 receives an OFF count reset signal S311 from the switch 311, and is set to "1" when detecting a rising of the OFF count reset signal S311, while being reset to "0" only when "0" is written by the CPU 390.

The switch 311 is connected with the data determination circuit 140 and the validity data determination circuit 210 via the AND gate 312, and further connected with the header detection circuit 130, the DH flag register 330, and the mode register 180. The switch 311 outputs an AND between the data completion receiving signal S140 from the data determination circuit 140 and the data validity signal S210 from the validity determination circuit 210 to the DH flag register 330 when the set value in the mode register 180 is "1". On the other hand, when the set value in the mode register 180 is "0", the switch 311 outputs the header detection signal S130 from the header detection circuit 130 to the DH flag register 330.

The OFF detection circuit 320 is connected with the DH flag register 330, and includes an OFF threshold register 222, an OFF counter 321, and an ON flag register 323. The OFF counter 321 always counts up, and is reset when the DH flag register 330 has a value of "1". The ON flag register 323 is sets to "1" when the DH flag register 330 has a value of "1", while being reset to "0" when the output value of the OFF counter 321 and the set value of the OFF threshold register 222 become equal.

The CPU 390 has two tasks T120 and T121 (which will be described later) as round robin tasks. The other components denoted by the same reference numerals as those in the aforementioned embodiments are the same as those described in the above embodiments.

Figure 14:
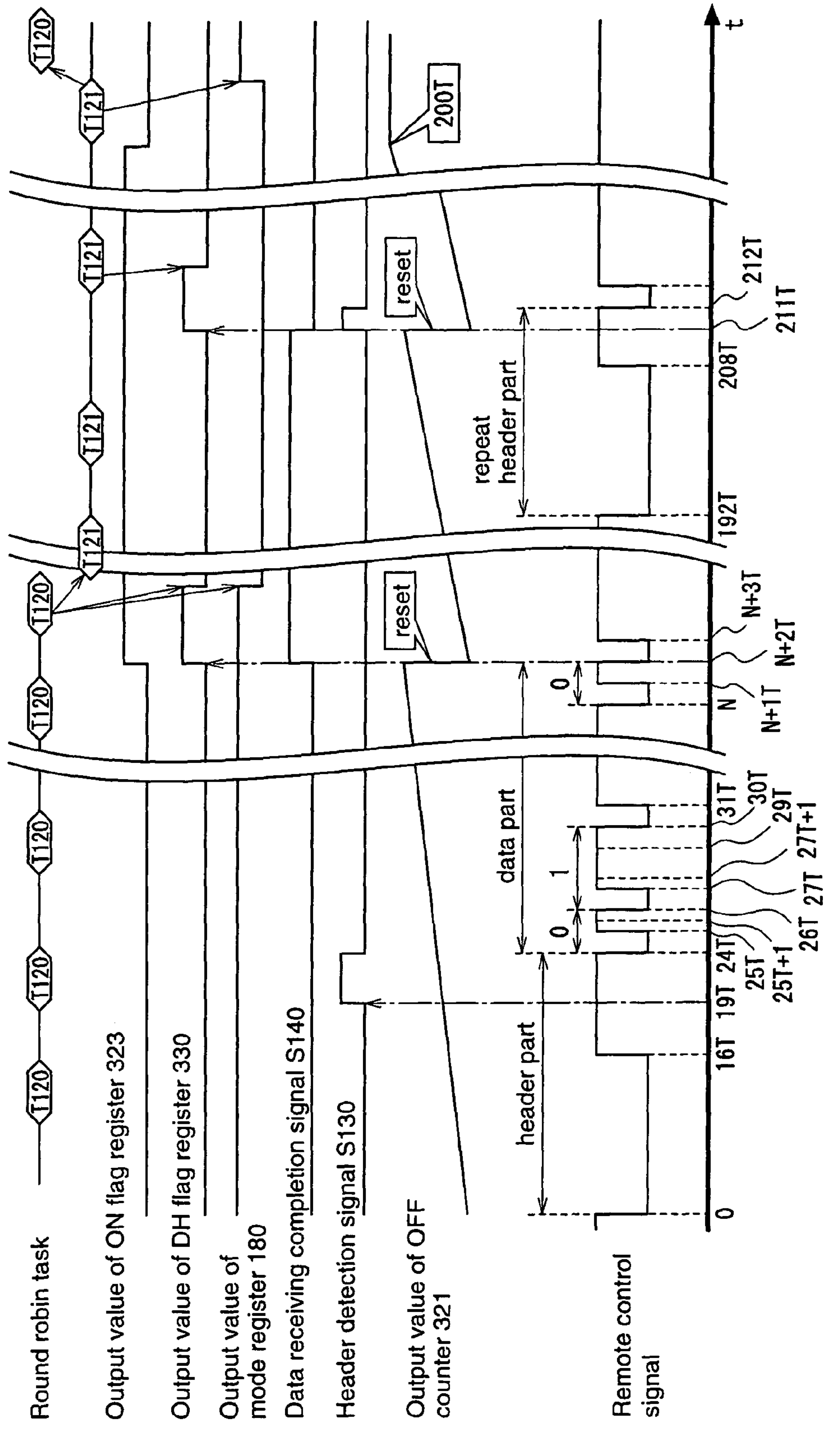
FIG. 14 is a timing chart for a remote control receiving circuit and a CPU in a case where a remote control signal that is outputted from a repeat-header type transmitter is received by the remote control receiving system according to the third embodiment.
Figure 15:
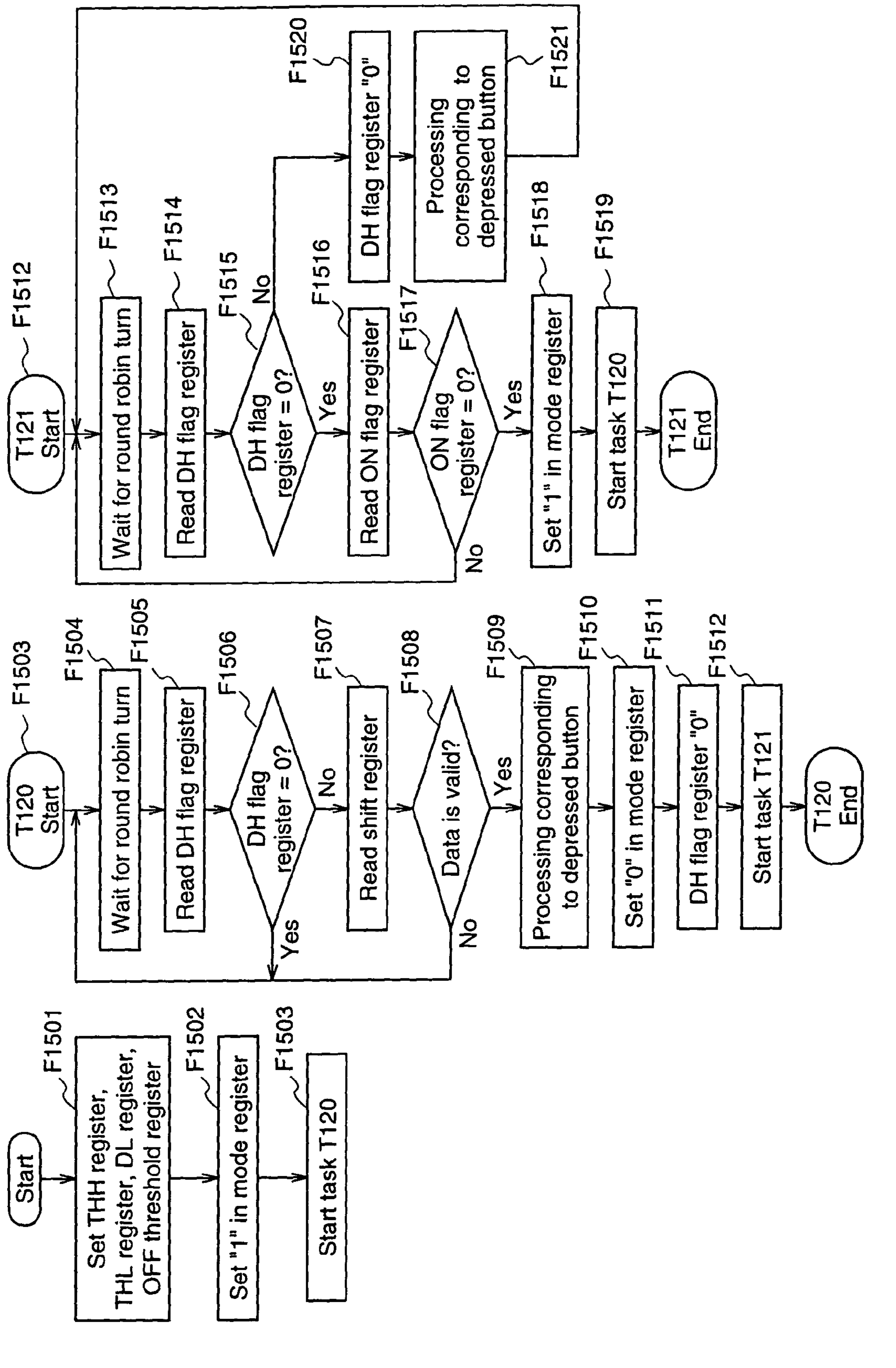
FIG. 15 are flowcharts showing a sequence of operations on the CPU side in a case where a remote control signal that is outputted from a repeat-header type transmitter is received according to the third embodiment, FIG. 15(*a*) being a flowchart showing processing on the CPU side, FIG. 15(*b*) being a flowchart showing processing of task T120 in the CPU, and FIG. 15(*c*) being a flowchart showing processing of task T121 in the CPU.
Figure 16:
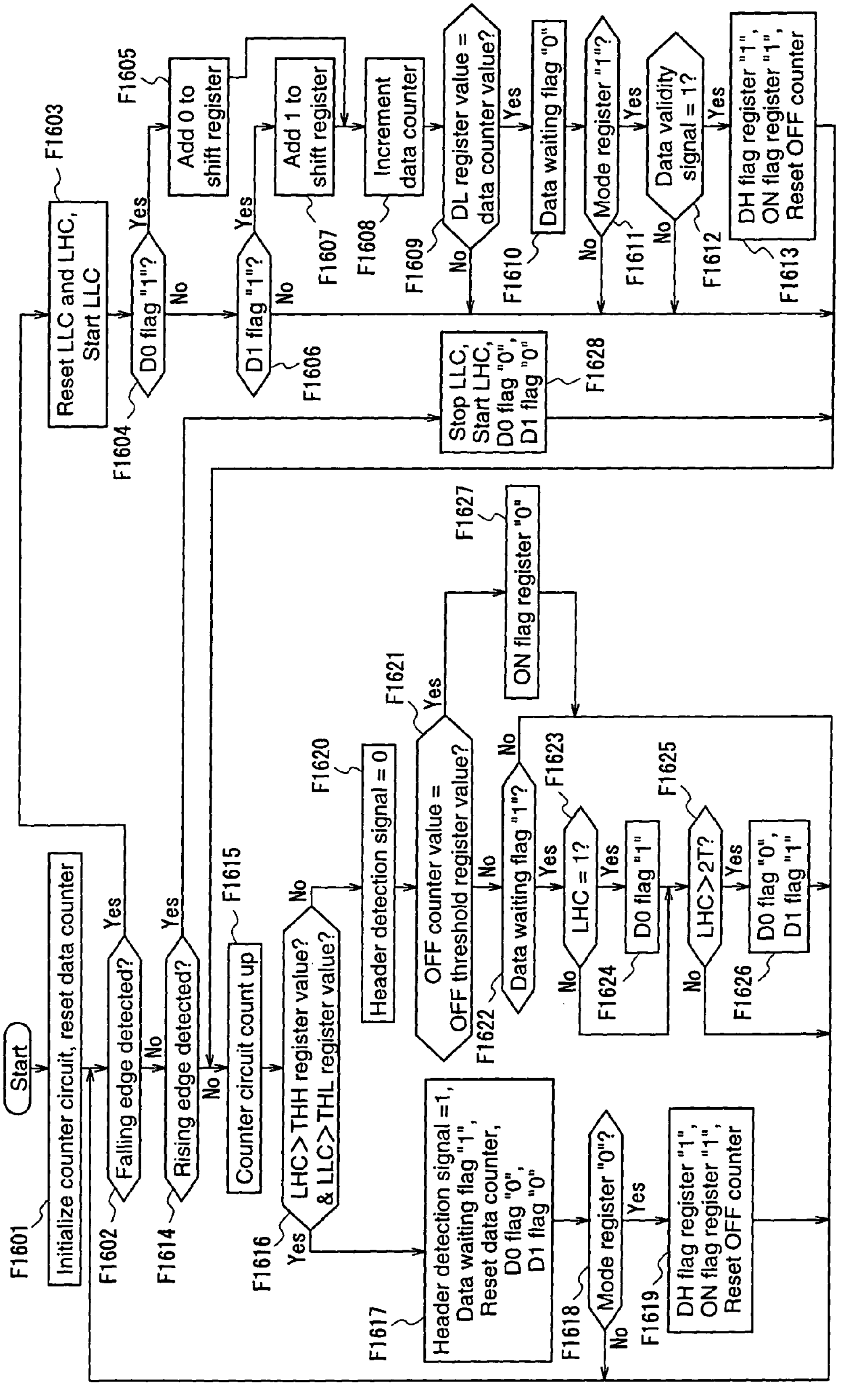
FIG. 16 is a flowchart showing processing in the remote control receiving circuit according to the third embodiment in a case where a remote control signal that is outputted from a repeat-header type transmitter is received.

Next, the flow of processing in the remote control receiving system having the above-mentioned construction in a case where a remote control signal that is outputted from a repeat-header type transmitter is received will be described with reference to FIGS. 14 to 16. FIG. 14 is a timing chart for the remote control receiving circuit and the CPU in the case where a remote control signal that is outputted from a repeat-header type transmitter is received by the remote control receiving system according to the third embodiment. FIG. 15(*a*) is a flowchart showing processing on the CPU side according to the third embodiment in the case where a remote control signal that is outputted from a repeat-header type transmitter is received. FIG. 15(*b*) is a flowchart showing processing of task T120 in the CPU according to the third embodiment. FIG. 15(*c*) is a flowchart showing processing of task T121 in the CPU according to the third embodiment. FIG. 16 is a flowchart showing processing in the remote control receiving circuit according to the third embodiment in the case where a remote control signal that is outputted from a repeat-header type transmitter is received.

Initially, as initial setting at the start of the operation, the CPU 390 sets values in the THL register 131 and the THH register 132 in the header detection circuit 130, the DL register 143 in the data determination circuit 140, the OFF threshold register 222 in the OFF detection circuit 320, and the mode register 180, like in the second embodiment (F1501 and F1502). Hereinafter, the values set in the respective registers will be specifically described. 6T is set in the THL register 131 in the header detection circuit 130, 3T is set in the THH register 132, 32 is set in the DLL register 143 in the data determination circuit 140, 200T is set in the OFF threshold register 222 in the OFF detection circuit 140, and "1" is set in the mode register 180.

After the values are set in the respective registers as described above, the CPU 390 starts task T120 as a round robin task (F1503).

On the remote control receiving circuit 300 side, the counter circuit 120 and the data counter 143 in the data determination circuit 140 are initialized at the start of the operation (F1601).

When the remote control button is depressed, a header part of the remote control signal comes first at the remote control receiving circuit 300. Assuming that the edge detection circuit 110 detects the first falling edge of the header part at time 0 (F1602), the LLC 121 and the LHC 122 in the counter circuit 120 are reset at time 0 (F1603). Since the D0 flag 145 and the D1 flag 144 in the data determination circuit 140 are both "0" at that time (F1604 and F1606), no data are stored in the shift register 250 and only the counter circuit 120 counts up (F1605).

Then, at time 6T, the output value of the LLC 121 that is counting a Low section in the header part of the remote control signal exceeds the value of the THL register 131.

At time 16T, a rising edge is detected (F1614), and then the LLC 121 in the counter circuit 120 counts to 16T and stops its operation, whereby the LHC 122 starts counting (F1627).

Then, at time 19T, the output value of the LHC 122 exceeds the set value of the THH register 132 in the header detection circuit 130. At that time, since the output value of the LLC 121 in the counter circuit 120 is kept at 16T, the output value of the LLC 121 is larger than the set value in the THL register 131 (F1616). In the above-mentioned embodiment, the header detection circuit 130 outputs the header detection signal S130 having a value of "1" to the data determination circuit 140 and the header interrupt generation circuit 160, whereby the operation of the header interrupt generation circuit 160 occurs, but in this third embodiment the following operation occurs.

That is, the header detection signal S130 having a value of "1" is outputted from the header detection circuit 130 to the data determination circuit 140 and the switch 311, then the data determination circuit 140 that has detected this rising edge of the header detection signal S130 sets the data waiting flag to "1", resets the data counter 143, and further resets the D1 flag 144 and the D0 flag 145 to "0" (F1617). Though the header detection signal S130 having a value of "1" from the header detection circuit 130 is transmitted to the switch 311, the header detection circuit 130 is not connected with the DH flag register 330 because the value of the mode register 180 is "1" at that time (F1618). Accordingly, the rising of the header detection signal S130 is not transmitted to the DH flag register 330, and the ON flag register 323 remains at "0". Consequently, the OFF counter 321 it not reset.

Then, at time 24T, the edge detection circuit 110 detects a falling edge (F1602), the LLC 121 and the LHC 122 in the counter circuit 120 are both reset (F1603), and consequently the respective values of the LLC 121 and the LHC 122 become lower than the values of the THL register 131 and the THH register 132 in the header detection circuit 130 (F1616), whereby the header detection signal S130 having a value of "0" is outputted (F1620). Then, the value of the OFF counter 321 and the value of the OFF threshold register 222 in the OFF detection circuit 320 are compared with each other (F1621). At that time, as the data waiting flag 141 in the data determination circuit 140 is already set to "1" (F1622), the D1 flag 144 and the D0 flag 145 in the data determination circuit 140 can be set.

At time 25T, the edge detection circuit 110 detects a rising edge (F1614), and the LLC 121 in the counter circuit 120 counts to 1T and stops counting (F1628).

At time 25T+1, the output value of the LHC 122 in the counter circuit 120 becomes equal to "1". At that time, the data waiting flag 141 in the data determination circuit 140 is "1" and the LHC 122 in the counter circuit 120 reaches "1" (F1623), whereby the D0 flag 145 in the data determination circuit 140 is set to "1" (F1624).

Then, when the edge detection circuit 110 detects a falling at time 26T (F1602), the data determination circuit 140 is notified of the falling edge by the edge detection circuit 110 in a situation where the D0 flag 145 is "1", whereby the LLC 121 and the LHC 122 in the counter circuit 120 are reset (F1603), and the shift register 250 is shifted by one bit to add "0" to the shift register 250 (F1605). At that time, the data counter 143 is incremented to "1" (F1608). Since the value of the data counter 143 has not reached a specified number of bits (F1609), the counter circuit 120 is counted up (F1615).

At time 27T, the edge detection circuit 110 detects a rising edge (F1614), and then the D0 flag 145 and the D1 flag 144 in the data determination circuit 140 are both reset to "0" (F1628).

Then, at time 27T+1, the D0 flag 145 is set to "1", like in the above-mentioned operation at time 25T+1 (F1624).

At time 29T, the LHC 122 in the counter circuit 120 counts to 2T, and as the data waiting flag 144 is "1" and the LHC 122 in the counter circuit 120 reaches "2T" (F1622, F1623, and F1625), the D0 flag 145 is set to "0", and the D1 flag 144 is set to "1" (F1626).

At time 30T, the edge detection circuit 110 detects a falling edge (F1602). At that time, the LLC 121 and the LHC 122 in the counter circuit 120 are reset (F1603). Since the data determination circuit 140 is notified of the detection of the falling edge by the edge detection circuit 110 in a situation where the D1 flag 144 is "1" (F1606), the shift register 250 is shifted by one bit to add "1" to the shift register 250 (F1607). At that time, the data counter 143 is incremented to "2" (F1608). As the value of the data counter 143 has not reached the specified number of bits (F1609), the counter circuit 120 counts up thereafter (F1615).

When the edge detection circuit 110 detects a rising edge at time 31T (F1614), the D0 flag 145 and the D1 flag 144 in the data determination circuit 140 are both reset to "0" (F1628). Hereinafter, the data of the data part in the remote control signal are stored in the shift register 250, bit by bit, in a like manner.

Thereafter, the above-mentioned operations are repeated. Assuming that the output value of the data counter 143 in the data determination circuit 140 is incremented to "31" at time N, the edge detection circuit 110 detects a rising edge at time N+1T, and detects a falling edge at time N+2T (F1602). Then, "0" is added to the shift register 250 (F1605), the output value of the data counter 143 in the data determination circuit 140 is incremented to "32" (F1608), and thus the value of the data counter 143 in the data determination circuit 140 and the set value in the DL register 142 become equal (F1609). At that time, the data waiting flag 141 in the data determination circuit 140 is reset to "0" (F1610), and at the same time the data receiving completion signal S140 having a value of "1" is outputted from the data determination circuit 140 to the data interrupt generation circuit 170. Further, since the mode register 180 is "1" at that time (F1611), the switch 311 selects an AND between the data receiving completion signal S140 from the data determination circuit 140 and the data validity signal S210 in the validity determination circuit 210. Thereafter, the validity determination circuit 210 determines whether the data stored in the shift register 250 is valid or not (F1612). When the data is determined to be valid, the data validity signal S210 having a value of "1" is outputted, then an OFF count reset signal S311, i.e., an AND "1" of the data receiving completion signal S140 having a value of "1" and the data validity signal S210 having a value of "1" is outputted to the DH flag register 330, whereby the DH flag register 330 is set to "1". Further, since the OFF detection circuit 320 detects the rising edge of the DH flag register 330, the OFF counter 321 in the OFF detection circuit 320 is reset, and the On flag register 323 is set to "1" (F1613).

Until the above-mentioned operation F1613 occurs, the task T120 is executed on the CPU 390 side, and accordingly the value of the DH flag register 330 is read each time the execution turn of the task T120 comes around (F1505). However, since the value of the DH flag register 330 is "0" then (F1506), the CPU 390 enters the queue of the round robin (F1504).

After the operation F1613 has occurred, "1" will be read from the DH flag register 330 in the task T120 on the CPU 390 side (F1506). Then, the CPU 390 reads the value of the shift register 250 (F1507), and evaluates the validity of the data read from the shift register 250 (F1508). When the data is not valid, the CPU 390 goes again into the round robin queue (F1504), while when the data is valid, the CPU 390 obtains information of the depressed button to start the corresponding processing (F1509).

Then, the CPU 390 sets the mode register 180 to "0" (F1510), resets the DH flag register 330 to "0" (F1511), thereafter starts the task 121 as a round robin task (F1512), and withdraws the presently-executed task T120 from the round robin task.

Since the data waiting flag 141 in the data determination circuit 140 is "0" from time N+3T, the D0 flag 145 and the D1 flag 144 in the data determination circuit 140 are not set to "1" but only the counter circuit 120 counts up, even when the output value of the LHC 122 in the counter value 120 becomes 1 or 2T.

When the remote control button is continuously depressed, the repeat header comes at time 192T.

At time 192T, the edge detection circuit 100 detects a falling edge (F1602), and the LLC 121 and the LHC 122 in the counter circuit 120 are reset (F1603).

At time 198T, the output value of the LLC 121 that is counting a Low section in the repeat header part exceeds the value of the THL register 131 in the header detection circuit 130.

Further, a rising edge is detected at time 208T (F1614), and then the LLC 121 in the counter circuit 120 counts to 16T and stops counting, whereby the LHC 122 starts counting (F1628).

Then, at time 211T, the output value of the LHC 122 exceeds the set value in the THH register 132 in the header detection circuit 130. At that time, since the output value of the LLC 121 in the counter circuit 120 remains at 16T, the output value of the LLC 121 is larger than the set value in the THL register (F1616). Therefore, the header detection circuit 130 outputs a header detection signal S130 having a value of "1" to the data determination circuit 140 and the header interrupt generation circuit 160 (F1617).

As the mode register 180 has been set to "0" at that time (F1618), the switch 311 selects the header detection signal S130 from the header detection circuit 130, whereby the OFF count reset signal S311 having a value of "1" is outputted to the DH flag register 330, the DH flag register 330 is set to "1", and further the OFF counter 321 in the OFF detection circuit 140 is reset in accordance with the rising edge of the DH flag register 330 (F1619).

At that time, on the CPU 390 side, the task T120 is withdrawn from the round robin task, and the task T121 is being executed. Then, since "0" has been set in the DH flag register 330, and "1" has been set in the ON flag register 323 in the OFF detection circuit 140 until the above-mentioned operation F1619 occurs (F1513 to F1517), the CPU 390 repeatedly goes into the round robin queue again each time the execution turn comes around (F1513).

Then, since the DH flag register 330 is set to "1" as described above in the operation F1619, the CPU 390 will read "1" from the HD flag register 330 after a while (F1515).

The CPU 390 resets the DH flag register 330 to "0" (F1520), and performs processing corresponding to the data that has been read in the operation F1507 of the task T120 (F1521).

Thereafter, the repeat header part comes to the remote control circuit 400 at intervals of 192T while the remote control button is continuously depressed, and each time the DH flag register 330 is set to "1" as described above, whereby the OFF counter 321 in the OFF detection circuit 320 is reset to 0 (F1619).

Then, each time the CPU 390 reads "1" from the DH flag register 330 in the operation F1515 of the task T121, the CPU 390 resets the DH flag register 330 to "0" (F1520), to perform processing corresponding to the continuously depressed button (F1521).

When the user releases the remote control button, no more repeat header comes, and then a long High section appears in the remote control signal. 200T after the last repeat header, the output value of the OFF counter 321 reaches 200T (F1621), and the ON flag register 323 is reset to "0" (F1623).

After awhile, the CPU 390 reads "0" from the DH flag register 330 and the ON flag register 323 (F1515 and F1517). Then, the CPU 390 sets the mode register 180 to "1" (F1518), starts the task T120 as a round robin task (F1519), and withdraws the presently-executed task T121 from the round robin task. In other words, the CPU 390 returns to the same status as that at the time the CPU 390 initially starts the task T120 (F1503).

Therefore, even when pulse noises enter the remote control receiving circuit 300 after the user releases the remote control button and the detection of a rising edge or a falling edge is notified by the edge detection circuit 110, the OFF counter 321 in the OFF detection circuit 140 is not reset unless it receives the header detection. Accordingly, the release of the remote control button is judged at an exact time that has been set in the OFF threshold register 222.

As described above, according to the remote control receiving system of the third embodiment, the interrupt generation circuit is not included in the remote control receiving circuit 300, whereby no interrupt is issued to the CPU 390 when the data part in the remote control signal that is received by the remote control receiving circuit 300 is composed of a main data part and an inverted data part that is obtained by inverting 0 and 1 of the main data part, like in the second embodiment. Further, the CPU 390 does not include the interrupt port but has a round robin task, whereby the resources of the CPU 390 which are used for the remote control receiving function can be further reduced.

Further, according to the remote control receiving system of the third embodiment, the ON flag register 323 and the OFF counter 321 are provided in the OFF detection circuit 320. Then, the value of the ON flag register 323 is reset to "0" when the value of the OFF counter 321 becomes equal to a threshold value (200T in this case) which is set in the OFF threshold register 222 to be used for detection of release of the remote control button, and when the ON flag register 323 come to have a value of "0", it is judged that the remote control button is released. Further, the OFF counter 321 that is compared with the set value in the OFF threshold register 222 is always counting up, and not reset unless the value of the DH flag register 330 becomes "1", i.e., a header detection is notified. Therefore, it is possible to prevent the reset of the counter caused by occurrence of an edge due to noises while the OFF counter is counting up to a certain period (200T in this case) after receipt of the last repeat header part of the remote control signal, whereby a delayed detection of release of the remote control button due to noises can be avoided.

In the above descriptions, the remote control receiving circuit 300 receives a remote control signal as shown in FIG. 22(*a*), which is composed of a repeat header part including no data when the button is continuously depressed. However, the remote control receiving circuit 300 may receive a remote control signal as shown in FIG. 22(*b*), in which the same waveform repeatedly follows when the button is continuously depressed.

Figure 17:
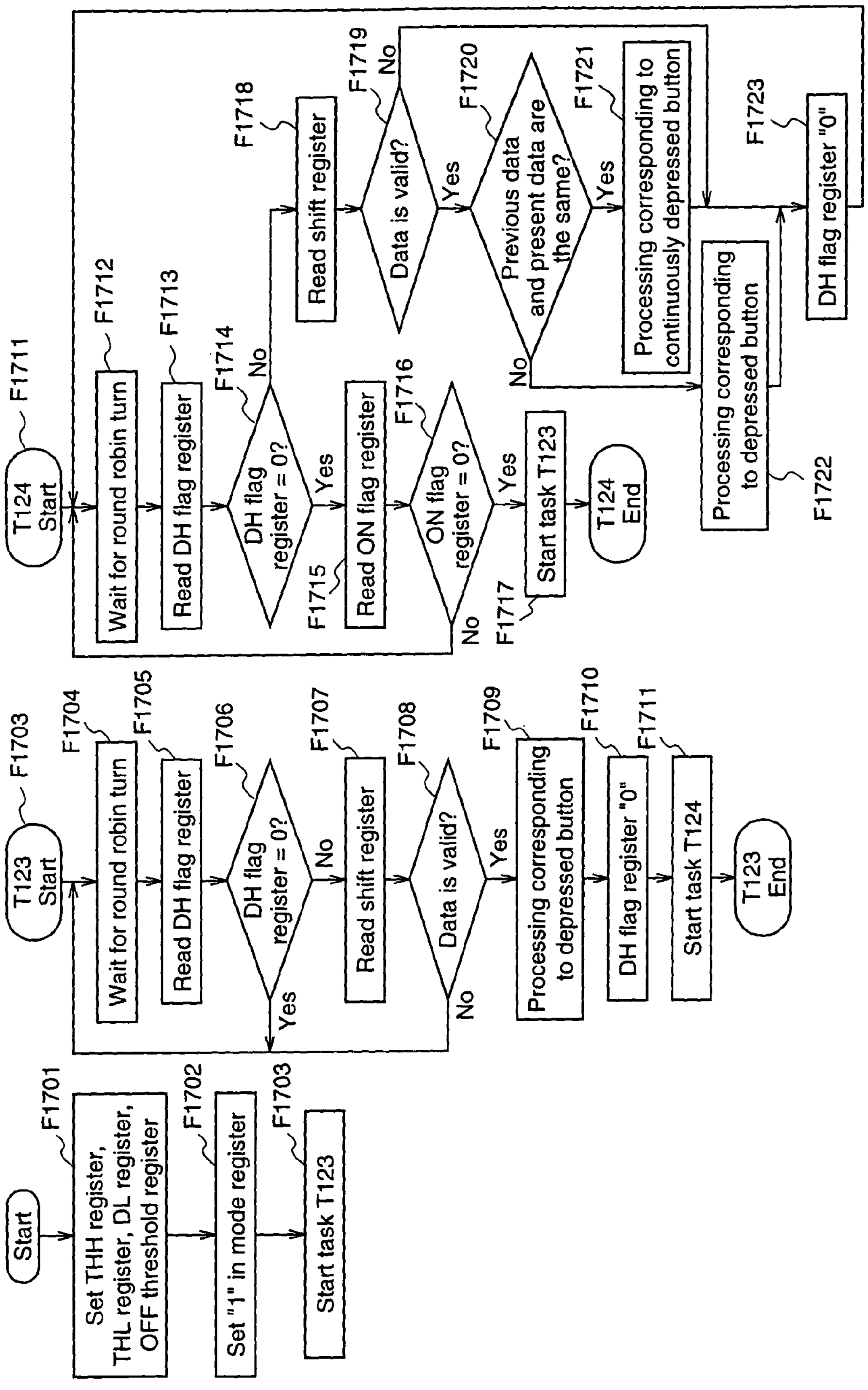
FIG. 17 are flowcharts showing a sequence of operations on the CPU side in a case where a remote control signal that is outputted from a repeated-data type transmitter is received according to the third embodiment, FIG. 17(*a*) being a flowchart showing processing on the CPU side, FIG. 17(*b*) being a flowchart showing processing of task T123 in the CPU, and FIG. 17(*c*) being a flowchart showing processing of task T124 in the CPU.

Hereinafter, the flow of processing in a case where a remote control signal that is outputted from a repeated-data type transmitter is received by the remote control receiving circuit 300 having the above-mentioned construction will be described, with reference to FIGS. 16 and 17. FIG. 17(*a*) is a flowchart showing processing on the CPU side according to the third embodiment in the case where a remote control signal of a repeated-data type is received. FIG. 17(*b*) is a flowchart showing processing of task T123 in the CPU according to the third embodiment. FIG. 17(*c*) is a flowchart showing processing of task T124 in the CPU according to the third embodiment.

The operations up to at time N+2T are the same as those in the above-mentioned sequence.

At time N+2T, the CPU 390 reads data that is determined to be valid by the validity determination circuit 210 (F1707), thereby performing processing corresponding to the depressed remote control button (F1709), as described above. When a repeat-header part is received thereafter as in the above-mentioned example, the CPU sets the value of the mode register 180 to "0", but in this case the CPU does not set the value of the mode register 180 again, but keeps the value at "1" to start task T124 (F1711).

When the remote control button is continuously depressed, a header part of repeated data arrives at time 192T. Then, after the same operations as those at times from 0 to N+2T are performed, the DH flag register 330 is set to "1" (F1613). From when the task T124 is started to when the above-mentioned operation of F1613 occurs, each time the execution turn of the task T124 comes around, the CPU 390 reads "0" from the DH flag register 330 (F1714), and reads "1" from the ON flag register 323 (F1716), thereby going again into the round robin queue of the task T124 (F1712). When the operation of F1613 occurs, the CPU 390 reads "1" from the DH flag register 330 after a while. Then, the CPU 390 reads data from the shift register 250 (F1718), and determines the validity of the data (F1719). When the data is invalid, the DH flag register 330 is cleared (F1723), and the round robin queue is started again (F1712). On the other hand, when the data is valid, it is judged whether the previously obtained data and the present data are the same or not (F1720). When these data are the same, it is judged that the remote control button is being continuously depressed, and processing corresponding to the continuously depressed button is performed (F1721). When these data are not the same, it is judged that another button is newly depressed, and processing corresponding to the newly depressed button is performed (F1722), and then the value of the DH flag register 330 is set to "0", whereby the round robin queue is started again (F1712).

When the user releases the remote control button, no more repeated data arrive, and a long High section appears in the remote control signal. Then, 200T after the last repeated data, the output value of the OFF counter 321 reaches 200T (F1621), and the ON flag register 323 is reset to "0" (F1627).

When the CPU 390 reads "0" from the DH flag register 330 and the ON flag register 323, in the task T124 (F1714 and F1716), the CPU 390 starts task T123 (F1717), and withdraw the presently executed task T124 from the round robin task. That is, the CPU 390 returns into a status at a time when the task T123 is started first (F1703).

As described above, the remote control receiving system according to this embodiment may apply also for the transmitter that transmits repeated data. Further, also in the case of receiving the repeated data, even when a waveform that may be identified as a header or waveform that may be identified as data due to noises or the like appears in the remote control receiving circuit 300 after the user releases the remote control button, the OFF counter 321 in the OFF detection circuit 140 is not reset unless a header part and a valid data part are detected. Therefore, the release of the remote control button can be judged at an exact time that has been set in the OFF threshold register 222.

EMBODIMENT 4

A remote control receiving circuit and a remote control receiving system according to a fourth embodiment of the present invention will be described with reference to FIGS. 18 to 20.

This fourth embodiment improves the accuracy of detecting a header part of a remote control signal.

Initially, a construction of the remote control receiving system according to the fourth embodiment will be described with reference to FIG. 18. FIG. 18 is a diagram illustrating a construction of the remote control receiving system according to the fourth embodiment.

In FIG. 18, the remote control receiving system according to the fourth embodiment is constituted by a remote control receiving circuit 400 that receives a remote control signal which is outputted from a transmitter (not shown), and a CPU 490 that sets arbitrary values in various registers in the remote control receiving circuit 400 to control the remote control receiving circuit 400. The remote control receiving circuit 400 includes an edge detection circuit 110, a counter circuit 420, a header detection circuit 430, a data determination circuit 140, a shift register 150, a header interrupt generation circuit 160, a data interrupt generation circuit 170, a mode register 180, and a switch 111. The CPU 490 is provided with one interrupt port 491 that receives an interrupt signal S111 from the remote control receiving circuit 400.

Hereinafter, the construction of the remote control receiving circuit 400 will be described in more detail. The counter circuit 420 includes a noise threshold register (hereinafter, referred to as a THN register) 423, in addition to the LLC 121 and the LHC 422. The THN register 423 is a register whose value is set by the CPU 490. The LHC 422 in the counter circuit 420 is reset to "0" on the condition that the edge detection circuit 110 detects a falling edged when the data waiting flag 144 is "1" or the header detection signal S430 is "1", or the LLC 121 and the THN register 423 have the same value when the data waiting flag 141 and the header detection signal S430 are both "0".

The header detection circuit 430 has a LongLow flag 433 (hereinafter, referred to as LLF), in addition to the THH register 132 and the THL register 131. The LLF 433 is set to "1" when the value of the LLC 121 becomes equal to the value of the THL register 131, while being reset to "0" when the data waiting flag 141 has a value of "1" or the output value of the LLC 121 become equal to the value of the THN register 423. The header detection circuit 430 outputs the header detection signal S430 having a value of "1" when the LLF 433 is "1" and the output value of the LHC 422 is higher than the set value in the THH register 132, while outputting the header detection signal S430 having a value of "0" in other cases. Other components of the remote control receiving system are the same as those in the first embodiment.

Next, the operation of the remote control receiving system having the above-mentioned construction will be described with reference to FIGS. 3, 19 and 20. FIG. 19 is a timing chart for the remote control receiving circuit and the CPU in a case where the remote control receiving system according to the fourth embodiment receives a header part of a remote control signal. FIG. 20 is a flowchart showing processing in the remote control receiving circuit according to the fourth embodiment in a case where a remote control signal that is outputted from a repeat-header type transmitter is received.

Initially, at the start of the operation, the CPU 490 sets a value of the THN register 423 in the counter circuit 420, in addition to the values of the THL register 131 and the THH register 132 in the header detection circuit 430, the DL register 142 in the data determination circuit 140, and the mode register 180 (F301 and F302).

Hereinafter, the values set in the respective registers will be specifically described. Like in the first embodiment, 6T is set in the THL register 131, 3T is set in the THH register 132, 32T is set in the DL register 142, and 1 is set in the mode register 180.

It is assumed here that 1T is set in the THN register 423. In other words, when a Low section that is shorter than 1T that is set in the THN register 423 appears in the LongHigh section in the header part of the remote control signal, this Low section is ignored as noises.

After setting the above-mentioned values in the respective registers, the CPU 490 waits for an issuance of data interrupt from the remote control receiving circuit 400.

The operations of the components in the remote control receiving circuit 400 other than the header detection circuit 430 are the same as those in the first embodiment. Therefore, only the operation of the header detection circuit 430 in a situation where noises occur in a waveform of a header part of the remote control signal will be described hereinafter.

When the remote control button is depressed, a header part of the remote control signal first comes to the remote control receiving circuit 400. Assuming that the edge detection circuit 110 detects the first falling edge of the header part at time 0, the LLC 121 in the counter circuit 420 is reset at time 0 (F2005).

At time 1T, the data waiting flag 141 and the header detection signal S430 are both "0" (F2029), and the output value of the LLC 121 in the counter circuit 420 is equal to the value of the THN register 423 (F2030). Therefore, the value of the LHC 422 in the counter circuit 420 is reset, as well as the LLF 433 in the header detection circuit 430 is reset to "0" (F2031).

Then, at time 6T, the output value of the LLC 121 in the counter circuit 420 and the value of the THL register 131 in the header detection circuit 430 become equal to each other (F2017), and at that time the LLF 433 in the header detection circuit 430 is set to "1" (F2018).

At time 16T, the edge detection circuit 110 detects a rising edge (F2015), and then at time 17T, the edge detection circuit 110 detects a falling caused by noises (F2002). As the value of the data waiting flag 141 and the header detection signal S430 are both "0" at this time (F2003), the LLC 121 in the counter circuit 420 is reset, and counting of the LLC 121 is started (F2005). However, the LHC 422 is not reset at that time but holds the count value "1T".

At time 17.5T, the negative pulse resulting from the noises ends, and the edge detection circuit 110 detects a rising edge (F2015). Thereby, the LLC 121 stops, and the LHC 422 starts counting (F2032), but since the LHC 422 is not reset but holds the count value "1T" at the above-mentioned time 17T, the LHC 422 starts counting from 1T.

At time 19, 5T, the output value of the LHC 422 becomes equal to the value of the THH register 132 in the header detection circuit 430 (F2019), and the header detection signal S430 having a value of "1" is outputted and simultaneously the data waiting flag 141 in the data determination circuit 140 is set to "1", and then the LLF 433 in the header detection circuit 430 is reset to "0" (F2020).

When the edge detection circuit 110 detects a falling edge at time 24T (F2002), the value of the LHC 422 is reset (F2004) and becomes smaller than the value of the THH register 132, whereby the header detection signal S430 falls (F2023). The following operations are the same as those in the first embodiment.

Figure 19:
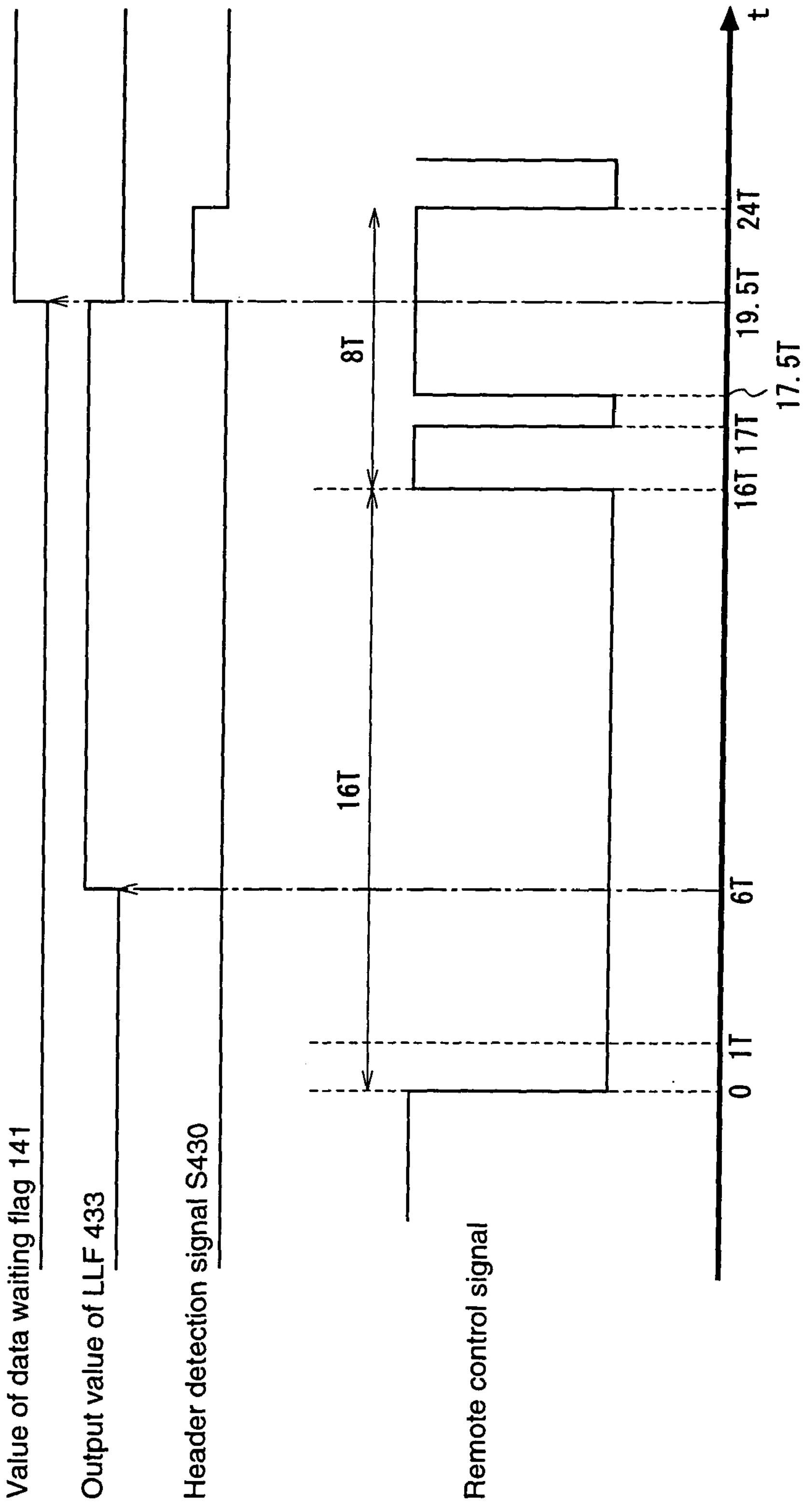
FIG. 19 is a timing chart for a remote control receiving circuit and a CPU in a case where a header part of a remote control signal is received by the remote control receiving system according to the fourth embodiment.
Figure 20:
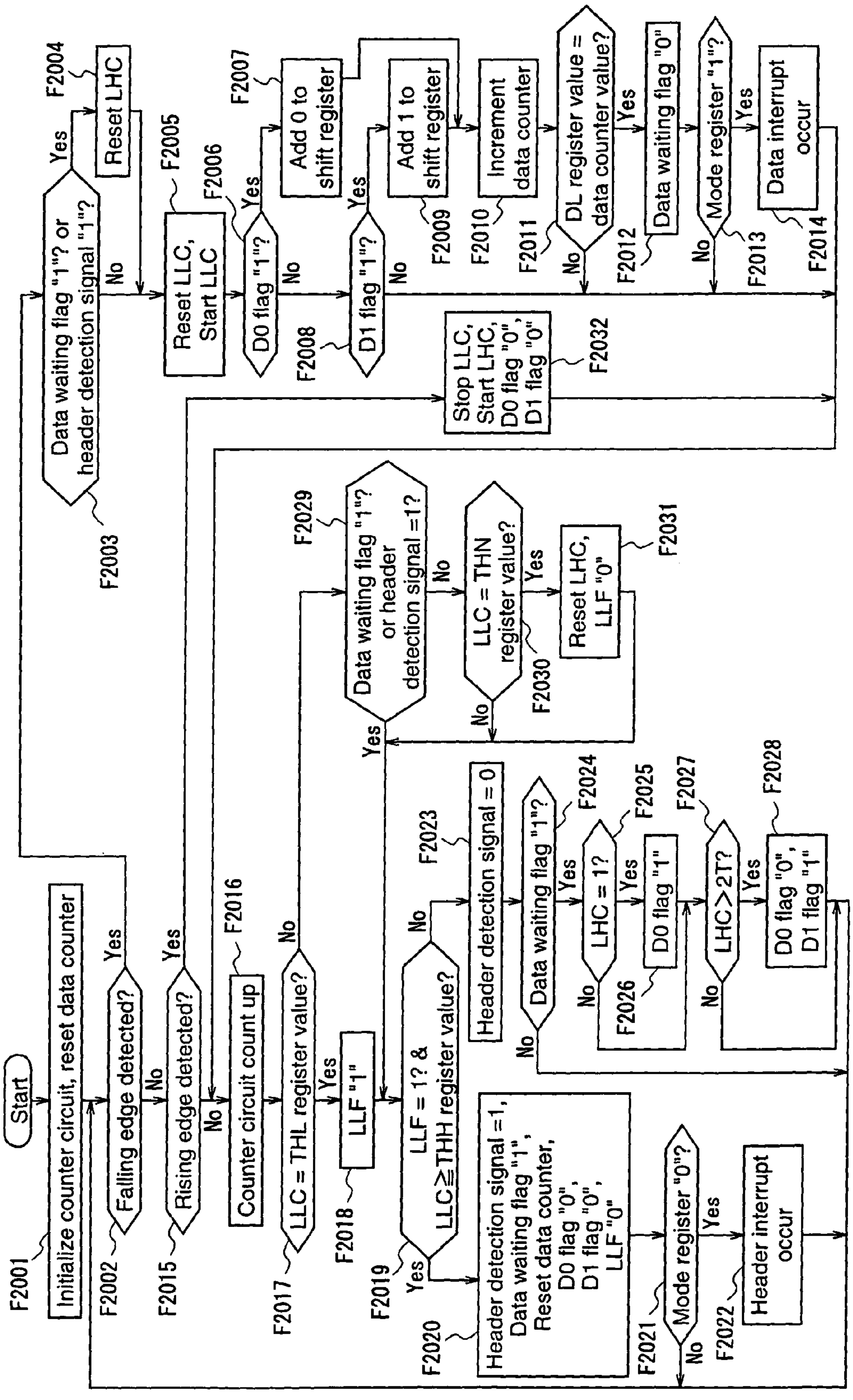
FIG. 20 is a flowchart showing processing by the remote control receiving circuit according to the fourth embodiment in a case where a remote control signal that is outputted from a repeat-header type transmitter is received.

As described above, according to the fourth embodiment, when the remote control receiving circuit 400 receives a remote control signal including noises which are shorter than a time period that is previously specified by the CPU 490, i.e., a period of 1T in this case, as shown in FIG. 19, these noises can be properly recognized and ignored, whereby the influence of noises can be suppressed at the detection of the header part in the remote control signal.

In any of the above-mentioned embodiments, the remote control signal that is inputted to the remote control receiving circuit is the signal as shown in FIG. 22(*a*). More specifically, in the header part of the remote control signal, the Low section is 16T and the High section is 8T, while in the repeat header part, the Low section is 16T and the High section is 4T. Further, the data part of the remote control signal is composed of 32 bits. When the duty between LongLow and Long High in the data part is 1:1, this portion corresponds to data "0", and when the duty is 1:3, this portion corresponds to data "1". Accordingly, 32 is set in the DL register 142 in the remote control receiving circuit, 3T is set in the THH register 132, 6T is set in the THL register 131. Further, the D1 flag 144 rises when the LHC has a value of "1T", whereby "1" is stored in the shift register 150, and the D0 flag 145 rises when the LHC has a value of "2T", whereby "0" is stored in the shift register 150. However, the set values in the respective registers, or rising or falling timing of the respective flags are not restricted to those as described above. Any remote control signal can be received by the remote control receiving system when the control is performed by setting the values corresponding to the remote control signal in the respective registers, and further setting a rising or falling timing of each flag at a timing corresponding to the remote control signal.

What is claimed is:

1. A remote control receiving system that is constituted by a remote control receiving circuit for receiving a remote control signal having a header part, and a data part corresponding to a remote control button depressed; and a CPU for controlling the remote control receiving circuit to decode the remote control signal received by the remote control receiving circuit, said remote control receiving circuit comprising:

an edge detection circuit that detects rising edges and falling edges of the remote control signal;

a counter circuit that counts a time interval between a rising edge and a falling edge of the remote control signal, and a time interval between a falling edge and a rising edge;

a header detection circuit that detects the header part of the remote control signal on the basis of the count value of the counter circuit;

a data determination circuit that determines 0 or 1 of the data part in the remote control signal on the basis of the count value of the counter circuit, and stores the determination result in an internal register;

a header interrupt generation circuit that outputs a header interrupt signal notifying detection of the header part in the remote control signal to the CPU, when the header part of the remote control signal is detected by the header detection circuit;

a data interrupt generation circuit that outputs a data interrupt signal notifying a data receiving completion for the remote control signal to the CPU, when data corresponding to the number of bits, which number has been previously specified by the CPU, are stored in the internal register by the data determination circuit after the header part of the remote control signal is detected by the header detection circuit; and a switch that selects one of the header interrupt signal and the data interrupt signal in accordance with an instruction of the CPU, said CPU having one interrupt port, and receiving the interrupt signal through the switch of the remote control receiving circuit, thereby controlling the remote control receiving circuit in accordance with the received interrupt signal, and determining that the remote control button is released when the interrupt signal from the switch is not received during a predetermined time period.

2. The remote control receiving system of claim 1 wherein the CPU instructs the switch to select the data interrupt signal at start of the operation of the remote control receiving system or at detection of release of the remote control button.

3. The remote control receiving system of claim 1 wherein when the remote control receiving circuit receives the remote control signal that has the header part and the data part, and successively receives a remote control signal that is composed only of a repeat header part without including the data part, the CPU instructs the switch to select the data interrupt signal at start of the operation of the remote control receiving system, then instructs to select the header interrupt after receiving the data interrupt signal from the remote control receiving circuit through the interrupt port, and instructs to select the data interrupt signal again when release of the remote control button is detected.

4. The remote control receiving system of claim 1 wherein after the data corresponding to the number of bits, which number has been previously specified by the CPU, are stored in the internal register, the data determination circuit does not update the data that are stored in the internal register until the header detection circuit detects the next header part.

5. The remote control receiving system of claim 1 wherein when receiving the next header part before the data corresponding to the number of bits, which has been previously specified by the CPU are stored in the internal register, the data determination circuit gives a higher priority to detection of the next header part in the header detection circuit.

6. The remote control receiving system of claim 1 wherein when the data part of the remote control signal is composed of a main data part, and an inverted data part that is obtained by inverting 0 and 1 of the main data part, the remote control receiving circuit includes a validity determination circuit that compares the main data part and the inverted data part of data stored in the internal register with each other, and determines the data to be valid when all of corresponding bits have different values while determining the data to be invalid in other cases, and the data interrupt generation circuit outputs the data interrupt signal when the data corresponding to the number of bits, which has been previously specified by the CPU, are stored in the internal register by the data determination circuit, and the data stored in the internal register are determined to valid by the validity determination circuit, after the header part of the remote control signal is detected by the header detection circuit.

7. The remote control receiving system of claim 6 wherein the remote control receiving circuit includes:

an OFF counter that continues to count up until a time period that has been previously specified by the CPU expires, and is reset when one of two conditions, which is specified by the CPU, that the header part of the remote control signal is detected by the header detection circuit, or that data corresponding to the number of bits, which has been previously specified by the CPU, are stored in the internal register by the data determination circuit and the data stored in the internal register are determined to be valid by the validity determination circuit, is met; and an OFF detection circuit that makes an ON flag rise when the OFF counter is reset, and makes the ON flag fall when the count value of the OFF counter and the period that has been previously specified by the CPU become equal to each other, and the CPU judges that the remote control button is released when the ON flag falls.

8. The remote control receiving system of claim 1 wherein the remote control receiving circuit includes an OFF detection circuit that makes an OFF flag rise when detecting that a logic level specified by the CPU continues for a longer time period than a period that has been previously specified by the CPU, on the basis of the count result by the counter circuit, and the CPU judges that the remote control button is released when the OFF flag rises.

9. The remote control receiving system of claim 1 wherein in a case where the header part of the remote control signal is composed of a waveform that keeps a certain logic level for a prescribed time period, and a waveform that keeps an opposite logic level for a prescribed time period, when the counter circuit detects a change in the logic level during a time period that has been previously specified by the CPU while the remote control receiving circuit is receiving a header part of the remote control signal, the counter circuit ignores the change in the logic level during the time period as a noise and starts counting from a count value before the logic level changes.

10. A remote control receiving system that is constituted by a remote control receiving circuit for receiving a remote control signal having a header part, and a data part corresponding to a remote control button depressed; and a CPU for controlling the remote control receiving circuit to decode the remote control signal received by the remote control receiving circuit, wherein when the data part of the remote control signal is composed of a main data part, and an inverted data part that is obtained by inverting 0 and 1 of the main data part, said remote control receiving circuit comprises:

an edge detection circuit that detects rising edges and falling edges of the remote control signal;

a counter circuit that counts a time interval between a rising edge and a falling edge of the remote control signal, and a time interval between a falling edge and a rising edge;

a header detection circuit that detects the header part of the remote control signal on the basis of the count value of the counter circuit;

a data determination circuit that determines 0 or 1 of the data part in the remote control signal on the basis of the count value of the counter circuit, and stores the determination result in an internal register;

a validity determination circuit that compares the main data part and the inverted data part of the data stored in the internal register with each other, and determines the data to be valid when all of corresponding bits have different values while determining the data to be invalid in other cases;

an OFF counter that continues to count up until a time period that has been previously specified by the CPU expires, and is reset when one of two conditions, which is specified by the CPU, that the header part of the remote control is detected by the header detection circuit, or that data corresponding to the number of bits, which has been previously specified by the CPU, are stored in the internal register by the data determination circuit and the data stored in the internal register are determined to be valid by the validity determination circuit, is met, an OFF detection circuit that makes an ON flag rise when the OFF counter is reset, and makes the ON flag fall when the time period that has been previously specified by the CPU and the count value of the OFF counter become equal to each other; and a data header flag that is set when the OFF counter is reset, and is reset by the CPU, and said CPU reads the value of the data header flag and the value of the ON flag in prescribed timings, respectively, and controls the remote control receiving circuit in accordance with the read values.

* * * * *